US011457605B2

(12) United States Patent
Lipscomb

(10) Patent No.: US 11,457,605 B2
(45) Date of Patent: *Oct. 4, 2022

(54) EXTRUDED SELF-CLUMPING CAT LITTER

(71) Applicant: Pioneer Pet Products, LLC, Cedarburg, WI (US)

(72) Inventor: John M. Lipscomb, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/668,975

(22) Filed: Mar. 25, 2015

(65) Prior Publication Data

US 2015/0196005 A1 Jul. 16, 2015
US 2016/0007561 A9 Jan. 14, 2016

Related U.S. Application Data

(63) Continuation-in-part of application No. 14/656,692, filed on Mar. 12, 2015, and a continuation-in-part of
(Continued)

(51) Int. Cl.
*A01K 1/015* (2006.01)
(52) U.S. Cl.
CPC .......... *A01K 1/0152* (2013.01); *A01K 1/0154* (2013.01); *A01K 1/0155* (2013.01)
(58) Field of Classification Search
CPC ... A01K 1/0152; A01K 1/0155; A01K 1/0154
(Continued)

(56) References Cited

U.S. PATENT DOCUMENTS 3,316,590 A 5/1967 Rettig
3,672,945 A 6/1972 Taylor
(Continued)

FOREIGN PATENT DOCUMENTS

DE 4424946 1/1996
FR 2794993 12/2000
(Continued)

OTHER PUBLICATIONS

ISR & Written Opinion dated May 24, 2016 in PCT/US2016/015000.
(Continued)

*Primary Examiner* — Colin W. Slifka
(74) *Attorney, Agent, or Firm* — Boyle Fredrickson S.C.

(57) ABSTRACT

Litter formed of extruded pellets containing water soluble binder sufficient to self-clump when wetted producing pellet clumps having a clump retention rate of at least 90% and which shrink after clump formation during drying producing a clump pulls away from any contacting solid surface minimizing adhesion therebetween. Such clumps preferably also have a crush strength of at least 15 PSI when dry. Pellets preferably contain water-soluble binder formed of starch physically modified during extrusion that solubilizes when wetted to facilitate clumping while opening the interior of the pellet improving absorption capacity. A preferred litter is formed of a mixture of extruded pellets of different sizes producing litter composed of extruded pellets falling within a plurality of different size ranges with the smaller sized pellets being fines that cause horizontally extending clumps to form on top of the litter.

23 Claims, 7 Drawing Sheets

Related U.S. Application Data application No. 14/605,045, filed on Jan. 26, 2015, now Pat. No. 10,028,481, and a continuation-in-part of application No. 13/868,073, filed on Apr. 22, 2013, now Pat. No. 9,266,089, and a continuation-in-part of application No. 13/868,084, filed on Apr. 22, 2013, now Pat. No. 9,266,090, and a continuation-in-part of application No. 13/842,534, filed on Mar. 15, 2013, now Pat. No. 9,266,088.

(60) Provisional application No. 61/952,133, filed on Mar. 12, 2014, provisional application No. 61/931,609, filed on Jan. 25, 2014, provisional application No. 61/775,707, filed on Mar. 11, 2013, provisional application No. 61/699,858, filed on Sep. 11, 2012.

(58) Field of Classification Search
USPC .......................................... 427/212; 119/173
See application file for complete search history.

(56) References Cited

U.S. PATENT DOCUMENTS

| | | | |
|---|---|---|---|
| 4,478,857 A | 10/1984 | Stauss | |
| 4,822,546 A | 4/1989 | Lohkamp | |
| 5,638,770 A | 6/1997 | Peleties | |
| 5,735,232 A | 4/1998 | Lang et al. | |
| 5,806,462 A | 9/1998 | Parr | |
| 5,942,170 A | 8/1999 | Peitz | |
| 6,220,206 B1 | 4/2001 | Sotillo et al. | |
| 6,720,406 B1 | 4/2004 | Eisner et al. | |
| 2003/0065296 A1 | 4/2003 | Kaiser et al. | |
| 2004/0112298 A1 | 6/2004 | Buttersnack et al. | |
| 2004/0244710 A1 | 12/2004 | Tsengas et al. | |
| 2005/0005869 A1 | 1/2005 | Fritter et al. | |
| 2007/0017453 A1 | 1/2007 | Fritter et al. | |
| 2007/0175403 A1 | 8/2007 | Wang et al. | |
| 2007/0289543 A1 | 12/2007 | Petska et al. | |
| 2008/0223302 A1 | 9/2008 | Wang et al. | |
| 2009/0000562 A1 | 1/2009 | Jenkins et al. | |
| 2009/0017166 A1 | 1/2009 | Wijnoogst et al. | |
| 2010/0269758 A1 | 10/2010 | Fuchshuber | |
| 2011/0185977 A1* | 8/2011 | Dixon .................. | B28C 5/46 119/173 |
| 2011/0253055 A1 | 10/2011 | Tang et al. | |
| 2011/0287123 A1 | 11/2011 | Feichtinger et al. | |
| 2012/0152115 A1 | 6/2012 | Gerds et al. | |
| 2013/0213313 A1 | 8/2013 | Wang et al. | |
| 2013/0213314 A1 | 8/2013 | Wang et al. | |

FOREIGN PATENT DOCUMENTS

| | | | | |
|---|---|---|---|---|
| JP | S62 143659 A | 6/1987 | | |
| JP | S62 208246 A | 9/1987 | | |
| JP | H03290126 | 12/1991 | | |
| JP | 2000051691 | 2/2000 | | |
| JP | 2007039954 | 2/2007 | | |
| JP | 2009195765 | 9/2009 | | |
| RU | 2153251 | 7/2000 | | |
| RU | 2273129 | 4/2006 | | |
| WO | 1984003513 | 9/1984 | | |
| WO | WO-2010133001 A1 * | 11/2010 | ........... | A01K 1/0152 |
| WO | 2011094022 | 8/2011 | | |
| WO | 2011134074 | 11/2011 | | |
| WO | 2014043284 | 3/2014 | | |

OTHER PUBLICATIONS

Stryapkov et al. Ekstruzionnaya obrabotka kak faktor polucheniya "ekologicheski bezopasnykh" produktov iz zerna i ego proizvodnykh. Vestnik OGU 2'2004, pp. 171-174.

Written Opinion dated Mar. 24, 2016 issued in PCT/US2015/062233.

ISR and Written Opinion dated Dec. 30, 2013 issued in PCT/US2013/059284.

ISR and Written Opinion dated Dec. 19, 2013 issued in PCT/US2013/059325.

ISR and Written Opinion dated Jun. 4, 2015 issued in PCT/US2015/012869.

International Preliminary Report on Patentability dated Apr. 22, 2016 issued in PCT/US2015/012969.

ISR and Written Opinion dated May 4, 2015 issued in PCT/US2015/012969.

Extended EP Search Report dated Apr. 22, 2016 issued in EP App. No. 13837242.0.

Extended EP Search Report dated Jun. 3, 2016 issued in EP App. No. 13837783.3.

ISR and Written Opinion dated Jun. 18, 2015 issued in PCT/US2015/020167.

ISR and Written Opinion dated Aug. 6, 2015 issued in PCT/US2015/020310.

Patent Examination Report No. 1 dated May 4, 2016 issued in AU 2013315516.

Murekatete et al. "Characterization of Ready-to-Eat Composite Porridge Flours Made by Soy-Maize-Sorghum-Wheat Extrusion Cooking Process", Pakistan Journal of Nutrition, Feb. 1, 2010 (Feb. 1, 2019), pp. 171-178.

Licata et al. "Determination of formulation and processing factors affecting slowly digestible starch, protein digestibility and antioxidant capacity of extruded sorghum-maize composite flour", International Journal of Food Science and Technology., vol. 49, No. 5, Dec. 30, 2013 (Dec. 30, 2013), pp. 1408-1419, XP055508277.

Mahasukhonthachat K et al.: "Kinetics of starch digestion and functional properties of twin-screw extruded sorghum", Journal of Cereal Science, Academic Press Ltd, GB, vol. 51, No. 3, May 1, 2010 (May 1, 2010), pp. 392-401, XP027058799, ISSN: 0733-5210.

* cited by examiner

EXTRUDED SELF-CLUMPING CAT LITTER

CROSS REFERENCE

This application claims priority in U.S. Provisional Patent Application Nos. 61/931,609 filed Jan. 25, 2014 and 61/952, 133 filed Mar. 12, 2014 under 35 U.S.C. § 119(e), is a continuation-in-part of each of U.S. patent application Ser. No. 14/656,692 filed Mar. 12, 2015, U.S. patent application Ser. No. 14/605,045 filed Jan. 26, 2015, each of which also claims priority in U.S. Provisional Patent Application No. 61/931,609 filed Jan. 25, 2014 and in U.S. Provisional Patent Application No. Mar. 12, 2014 under 35 U.S.C. § 119(e), and is a continuation-in-part of each of U.S. patent application Ser. No. 13/868,084 filed Apr. 22, 2013, U.S. patent application Ser. No. 13/868,073 filed Apr. 22, 2013, and U.S. patent application Ser. No. 13/842,534 filed Mar. 15, 2013, each of which claims priority in U.S. Provisional Patent Application No. 61/775,707 filed Mar. 11, 2013 and in U.S. Provisional Patent Application No. 61/699,858 filed Sep. 11, 2012 under 35 U.S.C. § 119(e), the entire disclosures of each of which is hereby expressly incorporated herein by reference.

FIELD

The present invention is directed to cat or animal litter, and more particularly to an extruded self-clumping cat litter.

BACKGROUND

Many attempts have been made in the past to try to make lightweight cat or animal litter. One type of sorbent commonly used in cat or animal litter is clay-based, typically made of bentonite granules. Conventional clay-based cat or animal litters typically have a density greater than 40 pounds per cubic feet, making them not only relatively costly to ship but relatively challenging to carry because litter containers tend to be rather heavy.

Conventional clay-based litter is typically made of granules of smectite, typically smectite or swelling clay(s), like bentonite clay(s), which frequently includes other components like calcium carbonate, silica, fragrances or scents, and odor controllers. While many attempts have been made in the past to produce lighter weight clay-based litters having bulk densities less than 40 pounds per cubic feet, these attempts have had limited success. Quite often litter performance is either adversely impacted or the weight reduction not all that significant.

While many attempts to produce lighter weight clay-based litter by adding lighter weight components are limited by the fact that such litters still require at least 70% swelling clays, typically bentonite, to still perform adequately as litter. This typically is because the lighter weight components added to reduce weight and bulk density are nothing more than fillers as they typically are not absorbent nor facilitate clumping. Because such litter still requires so much bentonite to adequately perform as a result, there is a limit to how much its weight and bulk density can be reduced.

One problem with a clay-based litters and clay-based sorbents in general is the fact that clay is not biodegradable. This requires spent clay-based litters to be put in the garbage for landfill disposal. For clay-based and other similar mineral or inorganic-based sorbents used to pick up oil, remediate chemical spills on land and in water, as well as treat oil spills on land and in water, disposal is a lot more complicated and costly. Expensive high temperature treatment in a kiln is typically required, which even then does not completely dispose of everything. While ash, pebbles and rocks leftover can be used in small percentages in concrete, it still needs to be handled and transported adding to overall disposal costs.

Other attempts have been made to produce litter from extruded pellets. Unfortunately past attempts have been heretofore unsuccessful as such extruded pellets were poorly absorbent, needed to be crushed in order to work, needed bentonite in the admixture, would not stick or clump when wetted, and/or would not form clumps that stay together among other deficiencies.

What is needed is an improved lightweight cat litter that does not suffer from at least one or more of these drawbacks.

SUMMARY

The present invention is directed to self-clumping litter formed of extruded sorbent litter pellets extruded from a starch-containing admixture at an extruder temperature and extruder pressure and/or extruder die pressure high enough to form water-soluble binder from starch in the admixture sufficient for pellets in a litter box to self-clump together when wetted. In a preferred litter, each pellet is extruded an admixture containing one or more cereal grains, with water-soluble binder formed in the extruded pellet from starch in the admixture during pellet extrusion sufficient to solubilize when wetted and at least become tacky enough to stick wetted pellets together forming clumps of pellets having a relatively high clump retention rate and which possess high crush strength.

In a preferred litter, extruded pellets have sufficient water soluble binder that pellet wetting solubilizes enough binder to at least make a portion of each wetted pellet tacky enough to stick to at least a plurality of other pellets clumping them together. In one such preferred litter, extruded pellets have sufficient water soluble binder that pellet wetting solubilizes enough binder to cause at least some of the binder to form a flowable adhesive with the wetting liquid, e.g., water or urine, which flows from the wetted pellet and around a plurality of pellets clumping them together. Where flowable adhesive is formed by wetting of extruded litter pellets with liquid, such as water, e.g., 2% saline solution, or urine, the flowable adhesive rapidly increases in viscosity after wetting from a viscosity of at least 200 centipoise within one second after wetting, increases to at least 300 centipoise after one second and within five seconds after wetting, increases to at least 400 centipoise after five seconds and within 10 seconds of wetting, and increases to at least 1000 centipoise after 10 seconds and within 30 seconds of wetting such that the liquid, e.g., water, in solubilizing water-soluble binder forms a relatively high viscosity flowable adhesive gel that relatively rapidly adheres together the at least plurality of pairs of wetted pellet forming a clump having a desirably high clump retention rate of at least 90% and which is preferably at least 92%.

Such a preferred litter is formed of extruded litter pellets each having a sufficient amount of water-soluble binder formed in each pellet during extrusion to self-clump when wetted. In one preferred extruded self-clumping, pellets are extruded having a water soluble content of at least 15% by pellet weight and a water soluble binder content of at least 7.5% by pellet weight. In another preferred extruded self-clumping litter, pellets are extruded having a water soluble content of at least 15% by pellet weight and a water soluble binder content of at least 10% by pellet weight. In still another preferred extruded self-clumping litter, pellets are extruded with a water soluble binder content of at least 15% by pellet weight. In another preferred extruded granular absorbent, pellets are extruded having a water soluble content of at least 20% by pellet weight and a water soluble binder content of at least 10% by pellet weight. In a further preferred extruded self-clumping litter, pellets are extruded having a water soluble content of at least 20% by pellet weight and a water soluble binder content of at least 15% by pellet weight. Such water soluble binder preferably is a cold water soluble binder, preferably a cold water soluble amylopectin binder, and more preferably an amorphous cold water soluble amylopectin binder, formed by physical modification of starch or starches, preferably by physical modification of amylopectin, in their original form in the admixture extruded to form each self-clumping litter pellet.

Litter formed of such extruded pellets advantageously self-clump when wetted forming clumps each having a desirably high clump retention rate of at least 90% and which is preferably at least 92%. Litter formed of such extruded pellets advantageously self-clump when wetted forming clumps each having a clump crush strength of at least 15 pounds per square inch, preferably at least 20 pounds per square inch, and more preferably at least 25 pounds per square inch when each clump is dried.

Extruded litter pellets of extruded self-clumping litter form clumps that shrink after formation at least 3%, preferably at least 5%, and more preferably at least 10% helping to produce clumps having such a high clump retention rate and/or high crush strength. Litter formed of such extruded pellets of the present invention produce clumps when the cat litter is wetted that shrink and advantageously condense through absorption and drying thereby causing the clump to pull away from any solid surface in contact with the clump minimizing clump adhesion with the solid surface helping prevent any portion of the clump from sticking thereto. As a result, such cat litter formed of extruded litter pellets of the present invention form clumps that shrink when wetted also thereby produce clumps that are of nonstick construction advantageously forming "clean" "non-stick" litter clumps in accordance with another aspect of the invention.

In addition to litter composed of extruded litter pellets of the present invention forming clean clumps when wetted, such litter composed of at least a plurality of extruded litter pellets per cubic inch volume of the litter used in their as extruded form advantageously produce de-dusting litter by each extruded pellet used in its as-extruded form acting as a dust magnet. Without being wetted, each extruded pellet used in extruded form in litter of the present invention has sufficient water-soluble material on and in an exterior surface of each pellet to cause dust in the litter to adhere to the water-soluble material of an outer pellet surface contacting the dust preventing such dust from becoming airborne. In a preferred embodiment, without being wetted, water soluble binder present in the outer surface of each extruded pellet used in extruded form in such a low-dust litter of the invention is dust attracting causing dust in the litter to stick to the water-soluble binder of extruded uncoated pellets in the litter, while the binder is dry, preventing such dust from becoming airborne. Such de-dusting extruded self-clumping litter composed of uncoated extruded litter pellet dust-magnets in accordance with the present invention enable retail bags or containers filled with such litter to contain less than 5% dust, preferably less than 3% dust and preferably less than 1% dust by litter weight.

In one preferred extruded self-clumping cat litter, the litter is formed of a mixture of extruded pellets having a plurality of different sizes that prevent liquid, e.g., water or urine, being absorbed from channeling downwardly between pellets thereby forming clumps on top of the litter which are generally horizontally oriented making such clumps easy to scoop out of the litter and dispose of. In such a preferred extruded litter, the litter has at least a plurality of pairs, i.e., at least three, of larger sized extruded litter pellets per cubic inch of litter volume of a first size range, and at least another plurality of pairs, i.e. at least three, of more finely sized extruded litter pellets per cubic inch of litter volume, e.g. fines, of a second size range smaller than the first size range. A preferred extruded self-clumping litter has at least 15% fines, preferably has at least 20% fines, with the remainder of the extruded pellets being larger sized pellets. Another preferred extruded self-clumping litter has at least 5% fines and preferably has between 5% and 40% fines, with the remainder of the extruded pellets being larger sized pellets. Still another preferred extruded self-clumping litter has at least 5% fines and preferably has between 10% fines and preferably has between 10% and 30% fines, with the remainder of the extruded pellets being larger sized pellets.

In one such preferred extruded self-clumping cat litter, the litter is formed of a mixture of at least a plurality of pairs, i.e., at least three, of larger sized extruded pellets per cubic inch of litter volume of a first size range, and at least another plurality of pairs, i.e. at least three, of more finely sized extruded pellets per cubic inch of litter volume, e.g. fines, of a second size range smaller than the first size range. Such fines preferably are formed of smaller sized extruded pellets having a size falling within the second size "fines" range but also can be formed of pieces of extruded pellets having a size falling within the second size "fines" range. Such an extruded self-clumping litter formed of a mixture of differently sized pellets has at least 5% fines, preferably at least 10% fines, more preferably at least 15% fines, with the remainder of the pellets of the litter being larger sized extruded pellets. Another preferred extruded self-clumping litter has at least 5% fines and preferably has between 5% and 40% fines, with the remainder of the extruded pellets being larger sized pellets. Still another preferred extruded self-clumping litter has at least 5% fines, preferably has between 5% fines and 35% fines, and more preferably has between 10% and 30% fines, with the remainder of the extruded pellets being larger sized pellets.

In a preferred litter embodiment, each litter pellet is extruded from an admixture not containing any smectite nor any binder additive and is used in uncoated form. In another preferred litter embodiment, each litter pellet is extruded from an admixture not containing any smectite nor any binder additive and is used without any smectite, e.g., bentonite, coating. In still another preferred litter embodiment, each litter pellet is extruded from an admixture not containing any smectite nor any binder additive and is used in its as-extruded form.

These and other objects, features and advantages of this invention will become apparent from the following detailed description of the invention and accompanying drawings.

DRAWING DESCRIPTION

Figure 1:
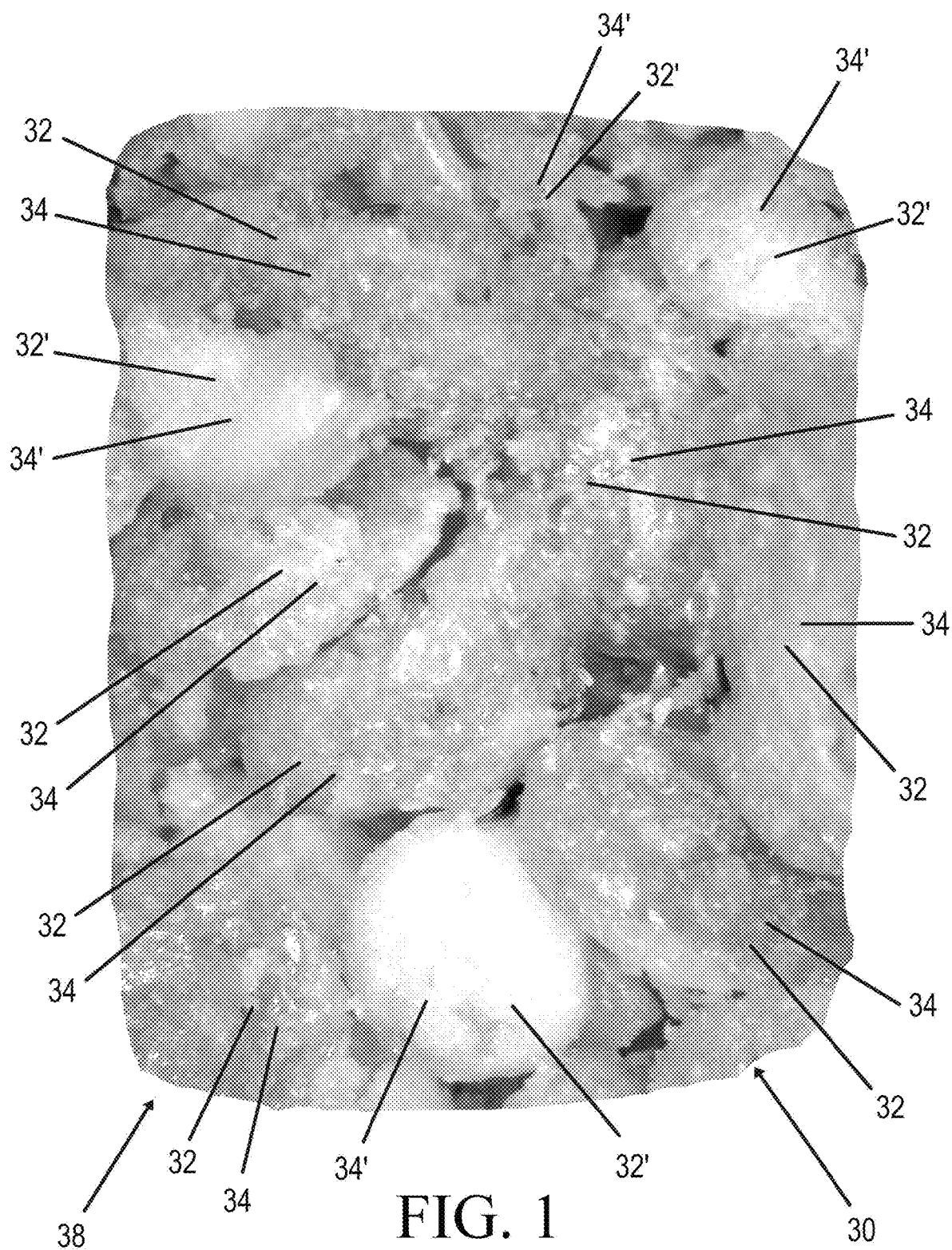
FIG. 1 is an enlarged color microscope photo of a preferred extruded granular sorbent formulated for use as cat litter of the present invention.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIGS. 1-7 illustrates a preferred embodiment of a scoopable or pourable self-clumping cat or animal litter 30 of the present invention which preferably is composed of at least a plurality of pairs, i.e., at least three, of sorbent granules 32 each formed of an extruded water soluble binder containing litter pellet 34 in accordance with the invention that preferably is extruded from starch containing material, e.g., starch-containing admixture, forming water-soluble binder during extrusion from at least some of the starch in the starch-containing material in an amount sufficient for at least one extruded litter pellet 34 to self-clump by agglutinating with a plurality of other extruded litter pellets 34 when the extruded litter pellets 34 are wetted forming a clump 36 of the extruded litter pellets 34 as depicted in FIGS. 4-7. Each litter pellet 34 is extruded from a starch-containing material, preferably starch-containing admixture, using a method of making self-clumping litter in accordance with the present invention producing extruded litter pellets 34 each containing at least 10% water soluble material, e.g., water solubles, preferably at least 15% water soluble material, and at least 7% water soluble binder, preferably at least 10% water soluble binder, by pellet weight.

As discussed in more detail below, litter 30 made in accordance with the present invention is relatively lightweight having a bulk density less than about 35 pounds per cubic foot, fast absorbing being able to rapidly absorb at least one times unused or unspent litter weight in water, e.g., 2% saline solution, within sixty seconds of being wetted with the water, highly absorbent being able to absorb at least 3.5 times, preferably at least 4.5 times unused or unspent litter weight in water, e.g., 2% saline solution, which form clumps 36 having at least a 92% clump retention rate, which form clumps 36 that shrink at least 3%, preferably at least 5%, when dried, e.g., in a litter box, to a moisture content of no greater than 20% moisture by clump weight, and which form clumps 36 that are biodegradable. In a preferred litter embodiment, litter 30 made in accordance with the present invention is relatively lightweight having a bulk density less than about 35 pounds per cubic foot, fast absorbing being able to rapidly absorb at least one times unused or unspent litter weight in water, e.g., 2% saline solution, within sixty seconds of being wetted with the water, highly absorbent being able to absorb at least 3.5 times, preferably at least 4.5 times unused or unspent litter weight in water, e.g., 2% saline solution, which form clumps 36 having at least a 95% clump retention rate, which form clumps 36 that shrink at least 3%, preferably at least 5%, when dried, e.g., in a litter box, to a moisture content of no greater than 20% moisture by clump weight, and which form clumps 36 each having a crush-strength of at least 15 pounds per square inch, preferably at least 20 pounds per square inch.

The starch-containing material preferably is a starch-containing admixture composed of one or more cereal grains, such as one or more of corn, wheat and/or sorghum, which can be in whole grain form, de-hulled or de-corticated form, de-germed form, and/or comminuted or ground form. The starch-containing material or starch-containing admixture preferably is extruded from a single screw extruder, preferably a 50 horsepower or 100 horsepower single screw extruder, at a residency time or cooking time of no greater than 12 seconds, preferably between 4-11 seconds, and more preferably between 5-10 seconds, at an extruder pressure and/or extruder die pressure of at least 1000 pounds per square inch, and at an extruder temperature of at least 125 degrees Celsius. The starch-containing material or starch-containing admixture extruded by the extruder in accordance with such extruder operating parameters preferably has a moisture content no greater than 30%, preferably no greater than 28%, more preferably no greater than 25%, by admixture weight such that dextrinization occurs during litter pellet extrusion. In one preferred method and admixture, the admixture preferably has a moisture content no greater than 28%, preferably no greater than 25%, by admixture weight with no additional water added to the extruder during extrusion.

In one preferred admixture formulation, the starch-containing admixture is composed of at least 50% whole grain de-hulled or de-corticated sorghum, can be composed of as much as 40% cellulose, e.g., cellulosic fiber, and can be composed of at least 10% of other constituents including scents or fragrances, dyes or colorants, surfactant(s), anti-bacterial agents, anti-fungal agents, anti-parasitic agents, and the like, with the admixture having a moisture content no greater than 25%, preferably no greater than 20%, by admixture weight. In one preferred sorghum-based admixture formulation, the starch-containing admixture is composed substantially completely of whole grain de-hulled or de-corticated sorghum, preferably white sorghum, with the admixture having a moisture content no greater than 20%, preferably no greater than 18%, more preferably no greater than 15%, by admixture weight. No additional water or moisture preferably is added to the extruder during extruder operation. In one such preferred sorghum-based admixture formulation, the starch-containing admixture is composed substantially completely of whole grain de-hulled or de-corticated sorghum, preferably white sorghum, with the admixture having a moisture content no greater than 20%, preferably no greater than 18%, more preferably no greater than 15%, by admixture weight with no water added to the admixture prior to or during extruder operation.

In a preferred litter embodiment, the litter 30 has at least a plurality of pairs of litter pellets 34 per cubic inch of the litter 30 extruded from such a starch-containing material, e.g., starch-containing admixture, which contains no smectite, e.g., contains no bentonite, and which is used in its substantially as-extruded form such that each extruded litter pellet 34 is not coated with any smectite, e.g., not coated with any bentonite. In one such preferred litter embodiment, the litter 30 is substantially completely composed of litter pellets 34 each extruded from a starch-containing material or starch-containing admixture that contains no smectite, e.g., contains no bentonite, with each litter pellet 34 used in its substantially as-extruded form in that each extruded litter pellet 34 is not coated with any smectite, e.g., not coated with any bentonite.

Each extruded litter pellet 34 preferably contains at least 7.5% of a water-soluble binder by as-extruded pellet weight formed from starch of the starch-containing material during pellet extrusion that is sufficient for wetted pellets 34 to self-clump together by agglutination where at least some water-soluble binder solubilizes when wetted causing at least an outer surface of each wetted pellet 34 to become sufficiently tacky for the wetted pellet 34 to stick to one or more adjacent pellets 34 in contact therewith. In a preferred embodiment, each extruded litter pellet 34 preferably contains at least 10% of a water-soluble binder by as-extruded pellet weight formed from starch of the starch containing material during pellet extrusion that is sufficient for wetted pellets 34 to self-clump together by agglutination where at least some water-soluble binder solubilizes when wetted causing (a) at least an outer surface of each wetted pellet 34 to become sufficiently tacky for the wetted pellet 34 to stick to one or more adjacent pellets 34 in contact therewith and/or (b) at least some of the water-soluble binder of each wetted pellet 34 to solubilize and form a flowable adhesive that flows from the wetted pellet 34 onto one or more adjacent pellets 34 adhesively gluing them together.

In one preferred embodiment, each extruded litter pellet 34 preferably contains at least 15% of a water-soluble binder by as-extruded pellet weight formed from starch of the starch containing material during pellet extrusion that is sufficient for wetted pellets 34 to self-clump together by agglutination where at least some water-soluble binder solubilizes when wetted causing (a) at least an outer surface of each wetted pellet 34 to become sufficiently tacky for the wetted pellet 34 to stick to one or more adjacent pellets 34 in contact therewith and/or (b) at least some of the water-soluble binder of each wetted pellet 34 to solubilize and form a flowable adhesive that flows from the wetted pellet 34 onto one or more adjacent pellets 34 adhesively gluing them together. In one such preferred embodiment, each extruded litter pellet 34 preferably contains at least 15% of a water-soluble binder by as-extruded pellet weight formed from starch of the starch containing material during pellet extrusion that is sufficient for wetted pellets 34 to self-clump together by agglutination where at least some water-soluble binder solubilizes when wetted causing (a) at least an outer surface of each wetted pellet 34 to become sufficiently tacky for the wetted pellet 34 to stick to one or more adjacent pellets 34 in contact therewith and (b) at least some of the water-soluble binder of each wetted pellet 34 to solubilize and form a flowable adhesive that flows from the wetted pellet 34 onto one or more adjacent pellets 34 adhesively gluing them together.

In one preferred embodiment, each extruded litter pellet 34 preferably contains at least 20% of a water-soluble binder by as-extruded pellet weight formed from starch of the starch containing material during pellet extrusion that is sufficient for wetted pellets 34 to self-clump together by agglutination where at least some water-soluble binder solubilizes when wetted causing (a) at least an outer surface of each wetted pellet 34 to become sufficiently tacky for the wetted pellet 34 to stick to one or more adjacent pellets 34 in contact therewith and/or (b) at least some of the water-soluble binder of each wetted pellet 34 to solubilize and form a flowable adhesive that flows from the wetted pellet 34 onto one or more adjacent pellets 34 adhesively gluing them together. In one such preferred embodiment, each extruded litter pellet 34 preferably contains at least 20% of a water-soluble binder by as-extruded pellet weight formed from starch of the starch containing material during pellet extrusion that is sufficient for wetted pellets 34 to self-clump together by agglutination where at least some water-soluble binder solubilizes when wetted causing (a) at least an outer surface of each wetted pellet 34 to become sufficiently tacky for the wetted pellet 34 to stick to one or more adjacent pellets 34 in contact therewith and (b) at least some of the water-soluble binder of each wetted pellet 34 to solubilize and form a flowable adhesive that flows from the wetted pellet 34 onto one or more adjacent pellets 34 adhesively gluing them together.

The water-soluble binder formed in each extruded litter pellet 34 from starch in the admixture during extrusion preferably is a cold-water soluble binder that is water soluble at temperatures below the gelatinization temperature of the type of starch in the admixture from which the binder is formed during extrusion. In a preferred method and embodiment, the water-soluble binder formed in each extruded litter pellet 34 from starch in the admixture during extrusion preferably is a cold-water soluble binder that is water soluble at temperatures below 60 degrees Celsius or 140 degrees Fahrenheit. In one preferred method and embodiment, the water-soluble binder formed in each extruded litter pellet 34 from sorghum starch in a sorghum-containing admixture during extrusion preferably is a cold-water soluble binder that is water soluble at temperatures below the gelatinization temperature of sorghum starch and preferably is water soluble at temperatures below 60 degrees Celsius or 140 degrees Fahrenheit. In one preferred method and embodiment, the water-soluble binder formed in each extruded litter pellet 34 from corn starch in a corn-containing admixture during extrusion preferably is a cold-water soluble binder that is water soluble at temperatures below the gelatinization temperature of maize or corn starch and preferably is water soluble at temperatures below 60 degrees Celsius or 140 degrees Fahrenheit.

The cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble binder formed of starch in the admixture modified, preferably physically modified, preferably dextrinized, e.g., physically modified via dextrinization, during extrusion to have a molecular weight of no greater than $10^6$, e.g., no greater than $10^6$ g/mol, which preferably has a molecular weight no greater than $10^5$, e.g., no greater than $10^5$ g/mol. In a preferred method and extruded litter pellet embodiment in accordance with the present invention, the cold-water soluble binder formed in each pellet 34 from starch in the admixture during extrusion is a cold-water soluble modified starch binder that preferably is a cold water soluble binder formed of starch in the admixture modified, preferably physically modified, preferably dextrinized, e.g., physically modified via dextrinization, during extrusion to have a degree of polymerization of no greater than 6,000 glucose units, preferably has a degree of polymerization of no greater than 5,000 glucose units, and more preferably has a degree of polymerization of no greater than 3,000 glucose units. In one such preferred method and embodiment, the cold-water soluble binder formed in each pellet 34 from starch in the admixture during extrusion is a cold-water soluble modified starch binder that preferably is a cold water soluble binder formed of starch in the admixture modified, preferably physically modified, preferably dextrinized, e.g., physically modified via dextrinization, during extrusion to have (a) a molecular weight of no greater than $10^6$, e.g., no greater than $10^6$ g/mol, which preferably has a molecular weight no greater than $10^5$, e.g., no greater than $10^5$ g/mol, and (b) a degree of polymerization of no greater than 6,000 glucose units, preferably has a degree of polymerization of no greater than 5,000 glucose units, and more preferably has a degree of polymerization of no greater than 3,000 glucose units.

In another preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble binder formed of starch in the admixture modified, preferably physically modified, preferably dextrinized, e.g., physically modified via dextrinization, during extrusion to have a molecular weight of no greater than $10^5$, e.g., no greater than $10^5$ g/mol, which preferably has a molecular weight no greater than $10^4$, e.g., no greater than $10^4$ g/mol. In a preferred method and extruded litter pellet embodiment in accordance with the present invention, the cold-water soluble binder formed in each pellet 34 from starch in the admixture during extrusion is a cold-water soluble modified starch binder that preferably is a cold water soluble binder formed of starch in the admixture modified, preferably physically modified, preferably dextrinized, e.g., physically modified via dextrinization, during extrusion to have a degree of polymerization of no greater than 5,000 glucose units, preferably has a degree of polymerization of no greater than 3,000 glucose units, and more preferably has a degree of polymerization of no greater than 1,000 glucose units. In one such preferred method and embodiment, the cold-water soluble binder formed in each pellet 34 from starch in the admixture during extrusion is a cold-water soluble modified starch binder that preferably is a cold water soluble binder formed of starch in the admixture modified, preferably physically modified, preferably dextrinized, e.g., physically modified via dextrinization, during extrusion to have (a) a molecular weight of no greater than $10^5$, e.g., no greater than $10^5$ g/mol, which preferably has a molecular weight no greater than $10^4$, e.g., no greater than $10^4$ g/mol, and (b) a degree of polymerization of no greater than 5,000 glucose units, preferably has a degree of polymerization of no greater than 3,000 glucose units, and more preferably has a degree of polymerization of no greater than 1,000 glucose units.

In a further preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble binder formed of starch in the admixture modified, preferably physically modified, preferably dextrinized, e.g., physically modified via dextrinization, during extrusion to have a molecular weight of no greater than $10^5$, e.g., no greater than $10^5$ g/mol, which preferably has a molecular weight no greater than $10^4$, e.g., no greater than $10^4$ g/mol. In a preferred method and extruded litter pellet embodiment in accordance with the present invention, the cold-water soluble binder formed in each pellet 34 from starch in the admixture during extrusion is a cold-water soluble modified starch binder that preferably is a cold water soluble binder formed of starch in the admixture modified, preferably physically modified, preferably dextrinized, e.g., physically modified via dextrinization, during extrusion to have a degree of polymerization of no greater than 2,000 glucose units, preferably has a degree of polymerization of no greater than 1,000 glucose units, and more preferably has a degree of polymerization of no greater than 500 glucose units. In one such preferred method and embodiment, the cold-water soluble binder formed in each pellet 34 from starch in the admixture during extrusion is a cold-water soluble modified starch binder that preferably is a cold water soluble binder formed of starch in the admixture modified, preferably physically modified, preferably dextrinized, e.g., physically modified via dextrinization, during extrusion to have (a) a molecular weight of no greater than $10^5$, e.g., no greater than $10^5$ g/mol, which preferably has a molecular weight no greater than $10^4$, e.g., no greater than $10^4$ g/mol, and (b) a degree of polymerization of no greater than 2,000 glucose units, preferably has a degree of polymerization of no greater than 1,000 glucose units, and more preferably has a degree of polymerization of no greater than 500 glucose units.

In still another preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble binder formed of starch in the admixture modified, preferably physically modified, preferably dextrinized, e.g., physically modified via dextrinization, during extrusion to have a molecular weight of no greater than $10^6$, e.g., no greater than $10^6$ g/mol, which preferably has a molecular weight no greater than $10^5$, e.g., no greater than $10^5$ g/mol. In a preferred method and extruded litter pellet embodiment in accordance with the present invention, the cold-water soluble binder formed in each pellet 34 from starch in the admixture during extrusion is a cold-water soluble modified starch binder that preferably is a cold water soluble binder formed of starch in the admixture modified, preferably physically modified, preferably dextrinized, e.g., physically modified via dextrinization, during extrusion to have a degree of polymerization of between 6,000 glucose units and 10 glucose units, preferably between 3,000 glucose units and 10 glucose units, and more preferably between 1,000 glucose units and 10 glucose units. In one such preferred method and embodiment, the cold-water soluble binder formed in each pellet 34 from starch in the admixture during extrusion is a cold-water soluble modified starch binder that preferably is a cold water soluble binder formed of starch in the admixture modified, preferably physically modified, preferably dextrinized, e.g., physically modified via dextrinization, during extrusion to have (a) a molecular weight of no greater than $10^6$, e.g., no greater than $10^6$ g/mol, and (b) a degree of polymerization of between 6,000 glucose units and 10 glucose units. In another such preferred method and embodiment, the cold-water soluble binder formed in each pellet 34 from starch in the admixture during extrusion is a cold-water soluble modified starch binder that preferably is a cold water soluble binder formed of starch in the admixture modified, preferably physically modified, preferably dextrinized, e.g., physically modified via dextrinization, during extrusion to have (a) a molecular weight of no greater than $10^6$, e.g., no greater than $10^6$ g/mol, and (b) a degree of polymerization of between 3,000 glucose units and 10 glucose units. In still another such preferred method and embodiment, the cold-water soluble binder formed in each pellet 34 from starch in the admixture during extrusion is a cold-water soluble modified starch binder that preferably is a cold water soluble binder formed of starch in the admixture modified, preferably physically modified, preferably dextrinized, e.g., physically modified via dextrinization, during extrusion to have (a) a molecular weight of no greater than $10^6$, e.g., no greater than $10^6$ g/mol, and (b) a degree of polymerization of no greater than 1,000 glucose units, preferably between 1,000 glucose units and 10 glucose units.

The cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble amylopectin-based binder formed of amylopectin starch in the admixture modified, preferably physically modified, preferably dextrinized, e.g., physically modified via dextrinization, during extrusion to have a reduced molecular weight of no greater than $10^6$, e.g., no greater than $10^6$ g/mol, which preferably has a molecular weight no greater than $10^5$, e.g., no greater than $10^5$ g/mol. In a preferred method and extruded litter pellet embodiment in accordance with the present invention, the cold-water soluble binder formed in each pellet 34 from starch in the admixture during extrusion is a cold-water soluble modified starch binder that preferably is a cold water soluble amylopectin-based binder formed of amylopectin starch in the admixture modified, preferably physically modified, preferably dextrinized, e.g., physically modified via dextrinization, during extrusion to have a reduced degree of polymerization of no greater than 6,000 glucose units, preferably has a degree of polymerization of no greater than 5,000 glucose units, and more preferably has a degree of polymerization of no greater than 3,000 glucose units. In one such preferred method and embodiment, the cold-water soluble binder formed in each pellet 34 from starch in the admixture during extrusion is a cold-water soluble modified starch binder that preferably is a cold water soluble amylopectin-based binder formed of amylopectin starch in the admixture modified, preferably physically modified, preferably dextrinized, e.g., physically modified via dextrinization, during extrusion to have (a) a reduced molecular weight of no greater than $10^6$, e.g., no greater than $10^6$ g/mol, which preferably has a molecular weight no greater than $10^5$, e.g., no greater than $10^5$ g/mol, and (b) a degree of polymerization of no greater than 6,000 glucose units, preferably has a reduced degree of polymerization of no greater than 5,000 glucose units, and more preferably has a degree of polymerization of no greater than 3,000 glucose units.

In another preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble amylopectin-based binder formed of amylopectin starch in the admixture modified, preferably physically modified, preferably dextrinized, e.g., physically modified via dextrinization, during extrusion to have a reduced molecular weight of no greater than $10^5$, e.g., no greater than $10^5$ g/mol, which preferably has a molecular weight no greater than $10^4$, e.g., no greater than $10^4$ g/mol. In a preferred method and extruded litter pellet embodiment in accordance with the present invention, the cold-water soluble binder formed in each pellet 34 from starch in the admixture during extrusion is a cold-water soluble modified starch binder that preferably is a cold water soluble amylopectin-based binder formed of amylopectin starch in the admixture modified, preferably physically modified, preferably dextrinized, e.g., physically modified via dextrinization, during extrusion to have a reduced degree of polymerization of no greater than 5,000 glucose units, preferably has a degree of polymerization of no greater than 3,000 glucose units, and more preferably has a degree of polymerization of no greater than 1,000 glucose units. In one such preferred method and embodiment, the cold-water soluble binder formed in each pellet 34 from starch in the admixture during extrusion is a cold-water soluble modified starch binder that preferably is a cold water soluble amylopectin-based binder formed of amylopectin starch in the admixture modified, preferably physically modified, preferably dextrinized, e.g., physically modified via dextrinization, during extrusion to have (a) a reduced molecular weight of no greater than $10^5$, e.g., no greater than $10^5$ g/mol, which preferably has a molecular weight no greater than $10^4$, e.g., no greater than $10^4$ g/mol, and (b) a reduced degree of polymerization of no greater than 5,000 glucose units, preferably has a degree of polymerization of no greater than 3,000 glucose units, and more preferably has a degree of polymerization of no greater than 1,000 glucose units.

In a further preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble amylopectin-based binder formed of amylopectin starch in the admixture modified, preferably physically modified, preferably dextrinized, e.g., physically modified via dextrinization, during extrusion to have a reduced molecular weight of no greater than $10^5$, e.g., no greater than $10^5$ g/mol, which preferably has a molecular weight no greater than $10^4$, e.g., no greater than $10^4$ g/mol. In a preferred method and extruded litter pellet embodiment in accordance with the present invention, the cold-water soluble binder formed in each pellet 34 from starch in the admixture during extrusion is a cold-water soluble modified starch binder that preferably is a cold water soluble amylopectin-based binder formed of amylopectin starch in the admixture modified, preferably physically modified, preferably dextrinized, e.g., physically modified via dextrinization, during extrusion to have a reduced degree of polymerization of no greater than 2,000 glucose units, preferably has a degree of polymerization of no greater than 1,000 glucose units, and more preferably has a degree of polymerization of no greater than 500 glucose units. In one such preferred method and embodiment, the cold-water soluble binder formed in each pellet 34 from starch in the admixture during extrusion is a cold-water soluble modified starch binder that preferably is a cold water soluble amylopectin-based binder formed of amylopectin starch in the admixture modified, preferably physically modified, preferably dextrinized, e.g., physically modified via dextrinization, during extrusion to have (a) a reduced molecular weight of no greater than $10^5$, e.g., no greater than $10^5$ g/mol, which preferably has a molecular weight no greater than $10^4$, e.g., no greater than $10^4$ g/mol, and (b) a reduced degree of polymerization of no greater than 2,000 glucose units, preferably has a degree of polymerization of no greater than 1,000 glucose units, and more preferably has a degree of polymerization of no greater than 500 glucose units.

In still another preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble amylopectin-based binder formed of amylopectin starch in the admixture modified, preferably physically modified, preferably dextrinized, e.g., physically modified via dextrinization, during extrusion to have a reduced molecular weight of no greater than $10^6$, e.g., no greater than $10^6$ g/mol, which preferably has a molecular weight no greater than $10^5$, e.g., no greater than $10^5$ g/mol. In a preferred method and extruded litter pellet embodiment in accordance with the present invention, the cold-water soluble binder formed in each pellet 34 from starch in the admixture during extrusion is a cold-water soluble modified starch binder that preferably is a cold water soluble amylopectin binder formed of amylopectin starch in the admixture modified, preferably physically modified, preferably dextrinized, e.g., physically modified via dextrinization, during extrusion to have a lesser degree of polymerization of between 6,000 glucose units and 10 glucose units, preferably between 3,000 glucose units and 10 glucose units, and more preferably between 1,000 glucose units and 10 glucose units. In one such preferred method and embodiment, the cold-water soluble binder formed in each pellet 34 from starch in the admixture during extrusion is a cold-water soluble modified starch binder that preferably is a cold water soluble amylopectin-based binder formed of amylopectin starch in the admixture modified, preferably physically modified, preferably dextrinized, e.g., physically modified via dextrinization, during extrusion to have (a) a lesser molecular weight of no greater than $10^6$, e.g., no greater than $10^6$ g/mol, and (b) a lesser degree of polymerization of between 6,000 glucose units and 10 glucose units. In another such preferred method and embodiment, the cold-water soluble binder formed in each pellet 34 from starch in the admixture during extrusion is a cold-water soluble modified starch binder that preferably is a cold water soluble amylopectin-based binder formed of amylopectin starch in the admixture modified, preferably physically modified, preferably dextrinized, e.g., physically modified via dextrinization, during extrusion to have (a) a lower molecular weight of no greater than $10^6$, e.g., no greater than $10^6$ g/mol, and (b) a lower degree of polymerization of between 3,000 glucose units and 10 glucose units. In still another such preferred method and embodiment, the cold-water soluble binder formed in each pellet 34 from starch in the admixture during extrusion is a cold-water soluble modified starch binder that preferably is a cold water soluble amylopectin-based binder formed of amylopectin starch in the admixture modified, preferably physically modified, preferably dextrinized, e.g., physically modified via dextrinization, during extrusion to have (a) a molecular weight of no greater than $10^6$, e.g., no greater than $10^6$ g/mol, and (b) a degree of polymerization of no greater than 1,000 glucose units, preferably between 1,000 glucose units and 10 glucose units.

In another preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble dextrin binder, i.e., dextrin, or dextrin-like cold water soluble binder having a molecular weight of within ±75% of the molecular weight of dextrin, preferably having a molecular weight of within ±75% of 504.43708, e.g., having a molecular weight of within ±75% of 504.43708 g/mol. In one such preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble dextrin binder, i.e., dextrin, or dextrin-like cold water soluble binder having a mean molecular weight of within ±75% of the mean molecular weight of dextrin, preferably having a mean molecular weight of within ±75% of 504.43708, e.g., having a mean molecular weight of within ±75% of 504.43708 g/mol. In another such preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble dextrin binder, i.e., dextrin, or dextrin-like cold water soluble binder having an average molecular weight of within ±75% of the average molecular weight of dextrin, preferably having an average molecular weight of within ±75% of 504.43708, e.g., having an average molecular weight of within ±75% of 504.43708 g/mol.

In yet another such preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble dextrin binder, i.e., dextrin, or dextrin-like cold water soluble binder formed of starch in the admixture modified, preferably physically modified, preferably dextrinized, e.g., physically modified via dextrinization, during extrusion to have a reduced molecular weight of within ±75% of the molecular weight of dextrin, preferably having a molecular weight of within ±75% of 504.43708, e.g., having a molecular weight of within ±75% of 504.43708 g/mol. In one such preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble dextrin binder, i.e., dextrin, or dextrin-like cold water soluble binder formed of starch in the admixture modified, preferably physically modified, preferably dextrinized, e.g., physically modified via dextrinization, during extrusion to have a reduced molecular weight possessing a mean molecular weight that is within ±75% of the mean molecular weight of dextrin, preferably having a mean molecular weight of within ±75% of 504.43708, e.g., having a mean molecular weight of within ±75% of 504.43708 g/mol. In another such preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble dextrin binder, i.e., dextrin, or dextrin-like cold water soluble binder formed of starch in the admixture modified, preferably physically modified, preferably dextrinized, e.g., physically modified via dextrinization, during extrusion to have a reduced molecular weight possessing an average molecular weight of within ±75% of the average molecular weight of dextrin, preferably having an average molecular weight of within ±75% of 504.43708, e.g., having an average molecular weight of within ±75% of 504.43708 g/mol.

In a further such preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble dextrin binder, i.e., dextrin, or dextrin-like cold water soluble amylopectin-based binder formed of amylopectin starch in the admixture modified, preferably physically modified, preferably dextrinized, e.g., physically modified via dextrinization, during extrusion to have a reduced molecular weight that is within ±75% of the molecular weight of dextrin, preferably having a molecular weight of within ±75% of 504.43708, e.g., having a molecular weight of within ±75% of 504.43708 g/mol. In one such preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble dextrin binder, i.e., dextrin, or dextrin-like cold water soluble amylopectin-based binder formed of amylopectin starch in the admixture modified, preferably physically modified, preferably dextrinized, e.g., physically modified via dextrinization, during extrusion to have a reduced molecular weight and a mean molecular weight within ±75% of the mean molecular weight of dextrin, preferably having a mean molecular weight of within ±75% of 504.43708, e.g., having a mean molecular weight of within ±75% of 504.43708 g/mol. In another such preferred method and extruded litter pellet embodiment, the cold water-soluble binder formed in each extruded litter pellet 34 from starch in the admixture during extrusion is a cold-water soluble modified starch binder that possesses adhesive properties, e.g., functions as a glue, when wetted, e.g., solubilized, which preferably is a cold water soluble dextrin binder, i.e., dextrin, or dextrin-like cold water soluble amylopectin-based binder formed of amylopectin starch in the admixture modified, preferably physically modified, preferably dextrinized, e.g., physically modified via dextrinization, during extrusion to have a reduced molecular weight possessing an average molecular weight of within ±75% of the average molecular weight of dextrin, preferably having an average molecular weight of within ±75% of 504.43708, e.g., having an average molecular weight of within ±75% of 504.43708 g/mol.

Figure 2:
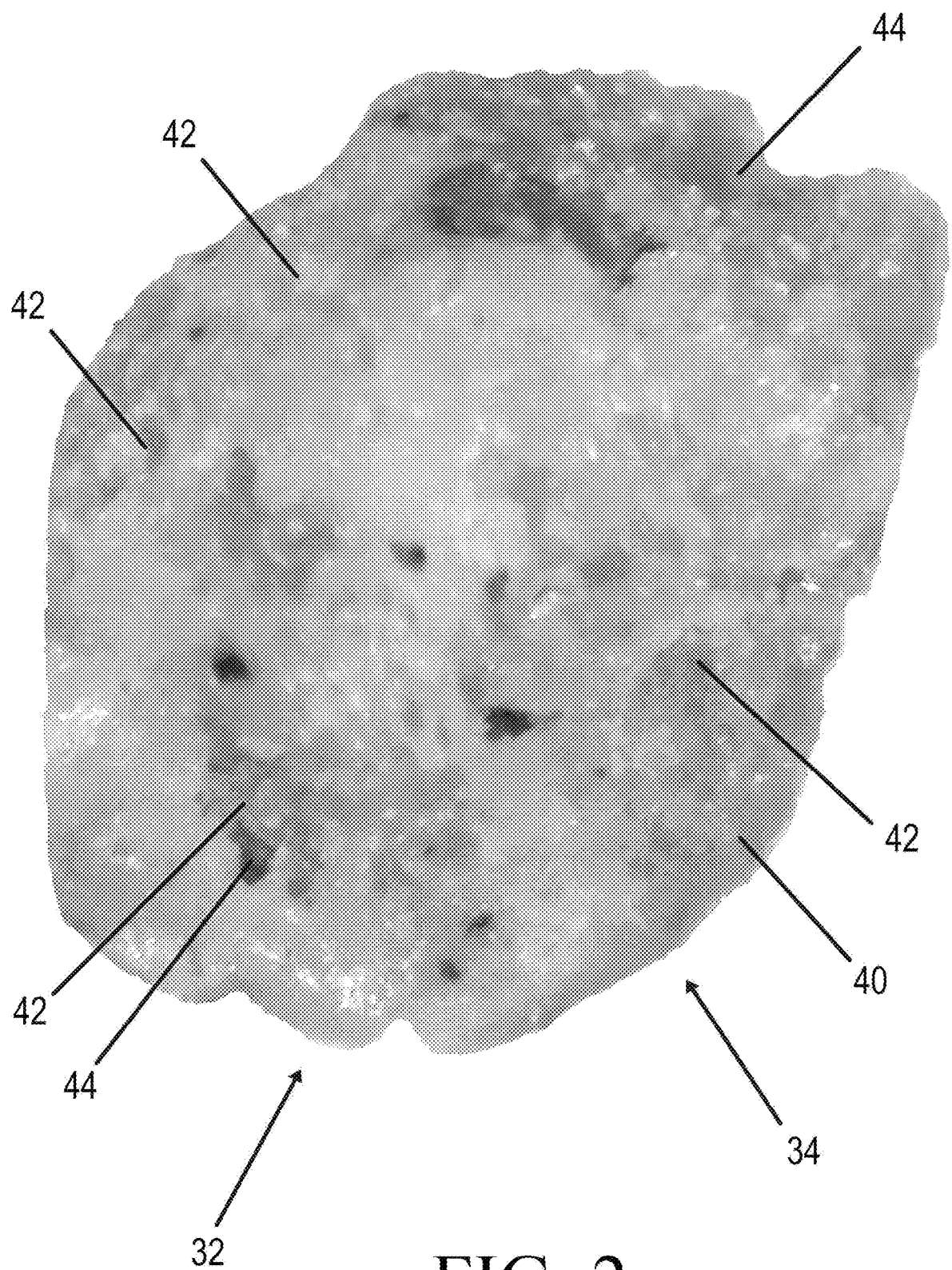
FIG. 2 is an enlarged color microscope photo of a preferred but exemplary extruded sorbent granule of the extruded granular sorbent of the present invention that is an extruded pellet used substantially in its as extruded form.
Figure 3:
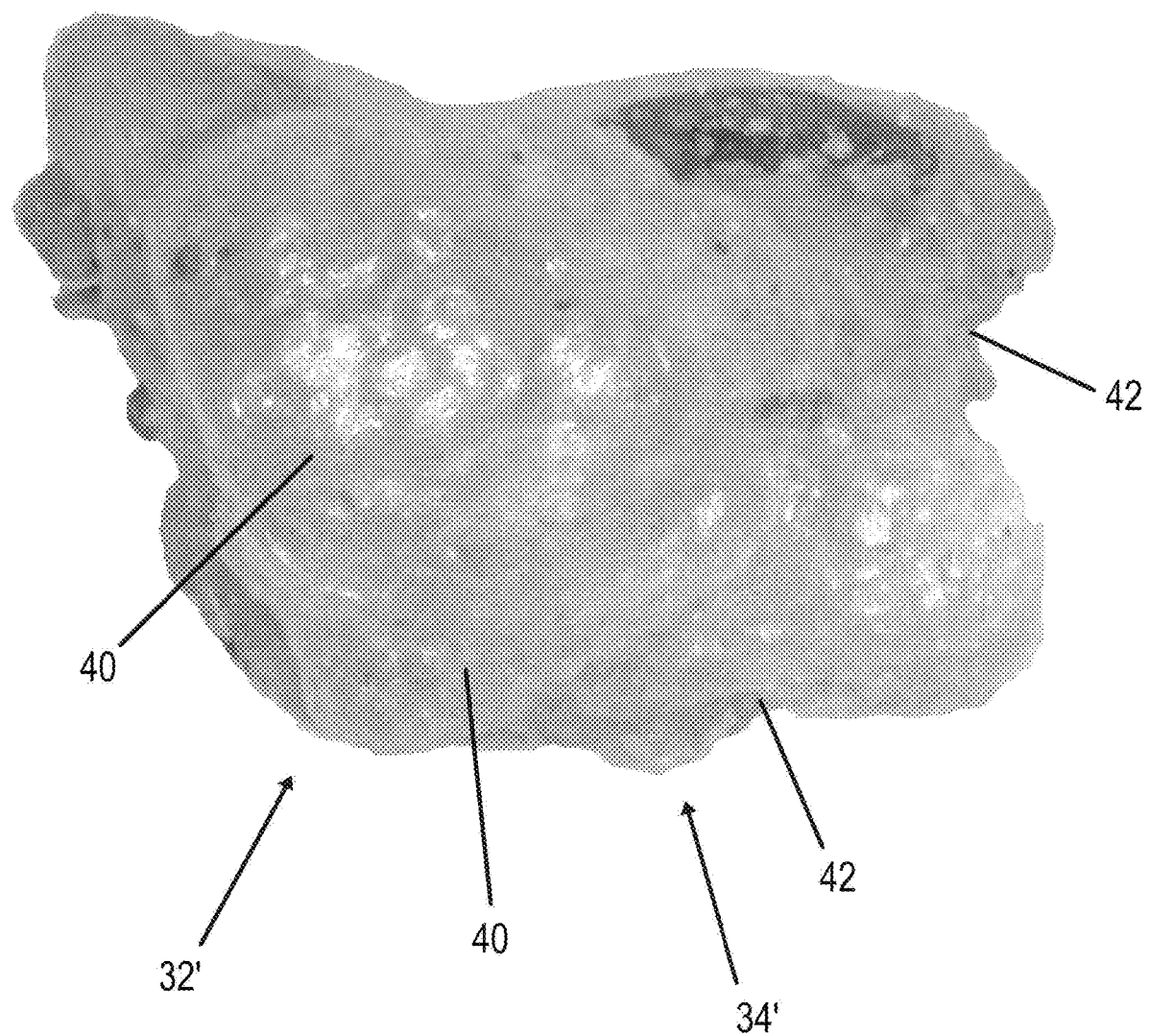
FIG. 3 is an enlarged color microscope photo of a of a second preferred but exemplary extruded sorbent granule of the extruded granular sorbent of the present invention that is an extruded pellet used substantially in its as extruded form.

With reference to FIGS. 2 and 3, each litter pellet 34 is extruded with (a) an outer surface 40 that is at least partially formed of water soluble material enabling at least a portion of the outer litter pellet surface 40 to solubilize or dissolve when wetted with liquid, such as water, e.g., 2% saline solution, urine and/or fecal matter during litter use, and (b) an interior (not shown) that also is at least partially formed of water soluble material enabling at least a portion of the outer litter pellet surface 40 to solubilize or dissolve when wetted with liquid, such as water, e.g., 2% saline solution, urine and/or fecal matter during litter use. Each extruded litter pellet 34 can have, and preferably does have a plurality of pores 42, preferably at least a plurality of pairs, i.e., at least three, of the pores 42, in its outer pellet surface 40 preferably formed during pellet extrusion. Each extruded litter pellet 34 can have, and preferably does have at least a plurality of voids or pockets 44, e.g., air pockets 44, formed in the interior of the pellet 34 preferably also formed during pellet extrusion. In a preferred extruded litter pellet embodiment, at least one and preferably at least a plurality of the pores 42 formed in the outer surface 40 of each extruded pellet 34 communicates with, e.g., is in fluid or liquid communication with, at least one of the internal voids or pockets 44 inside the pellet 34.

Such a partially dissolving extruded litter pellet 34 of the present invention is not only of self-clumping construction, each such partially dissolving extruded litter pellet 34 facilitates rapid absorption of liquid when wetted substantially completely absorbing at least one times the weight of unspent or unused litter pellets 34 in water, e.g., 2% saline solution, urine and/or liquid fecal matter within ninety seconds, preferably within sixty seconds, such that all of the water, urine and/or liquid fecal matter is retained by the resultant clump 36 of wetted pellets 34 that forms. Such a partially dissolving extruded litter pellet 34 of the present invention facilitates more rapid and more complete liquid absorption by having pores 42 in the outer surface 40 of each pellet 34 through which water, urine and/or liquid fecal matter is drawn into each wetted pellet 34 during litter use including via wicking, surface tension and/or capillary action. Such a partially dissolving extruded litter pellet 34 of the present invention also facilitates more rapid and more complete liquid absorption by having at least a plurality pores 42 in the outer surface 40 of each pellet 34 each being in fluid-flow or liquid-flow communication with at least one inner void or pocket 44 enabling water, urine and/or liquid fecal matter drawn into each one of the plurality of pores 42 to be relatively rapidly channeled through the pores 42 into a corresponding inner void or pocket 44 including via wicking, surface tension and/or capillary action. This channeling action enables a greater volume of water, urine and/or liquid fecal matter to be more rapidly absorbed into each extruded litter pellet 34.

In addition, the partially dissolving construction of each extruded litter pellet 34 of the present invention further facilitates more rapid absorption as water soluble portions of the pellet outer surface 40 and interior substantially instantaneously solubilize within two seconds, preferably within one second, of being wetted increasing the absorption volume of and within each pellet 34 within two seconds, preferably within one second, of being wetted. Water soluble material of the outer surface 40 of each wetted pellet 34 not only solubilizes or dissolves producing flowable adhesive that self-clumps wetted pellets 34 together but also creates at least a plurality of pores in addition to the pores 42 originally formed during pellet extrusion providing additional liquid-absorbing pathways or channels into the interior of each wetted pellet 34. The water soluble material of the outer surface 40 of each wetted pellet 34 also enlarges at least one and preferably enlarges at least a plurality of the pre-existing pores 42 enabling each liquid-solubilized enlarged pore 42 to allow a greater volume of liquid to enter not only increasing wetted pellet absorption capacity but also increasing the rate of liquid absorption. Water soluble material of the interior of each wetted pellet 34 not only solubilizes or dissolves producing flowable adhesive that self-clumps wetted pellets 34 together but also creates one or more voids or pockets (not shown) within each wetted pellet 34 that provides additional liquid-absorbing pathways or channels into the interior of each wetted pellet 34 thereby advantageously increasing the amount or volume of liquid each partially dissolved wetted pellet 34 absorbs during litter use.

Such a partially dissolving extruded litter pellet construction formed during extrusion results in extruded litter pellets 34 of the present invention being able to rapidly absorb one times its weight in water, e.g., 2% saline solution, in less than ninety seconds, preferably less than sixty seconds, absorbs at least 3.5 times litter pellet weight in water, e.g., 2% saline solution, and preferably is capable of absorbing more than 4.5 times litter pellet weight in water, e.g., 2% saline solution, during litter use.

Figure 4:
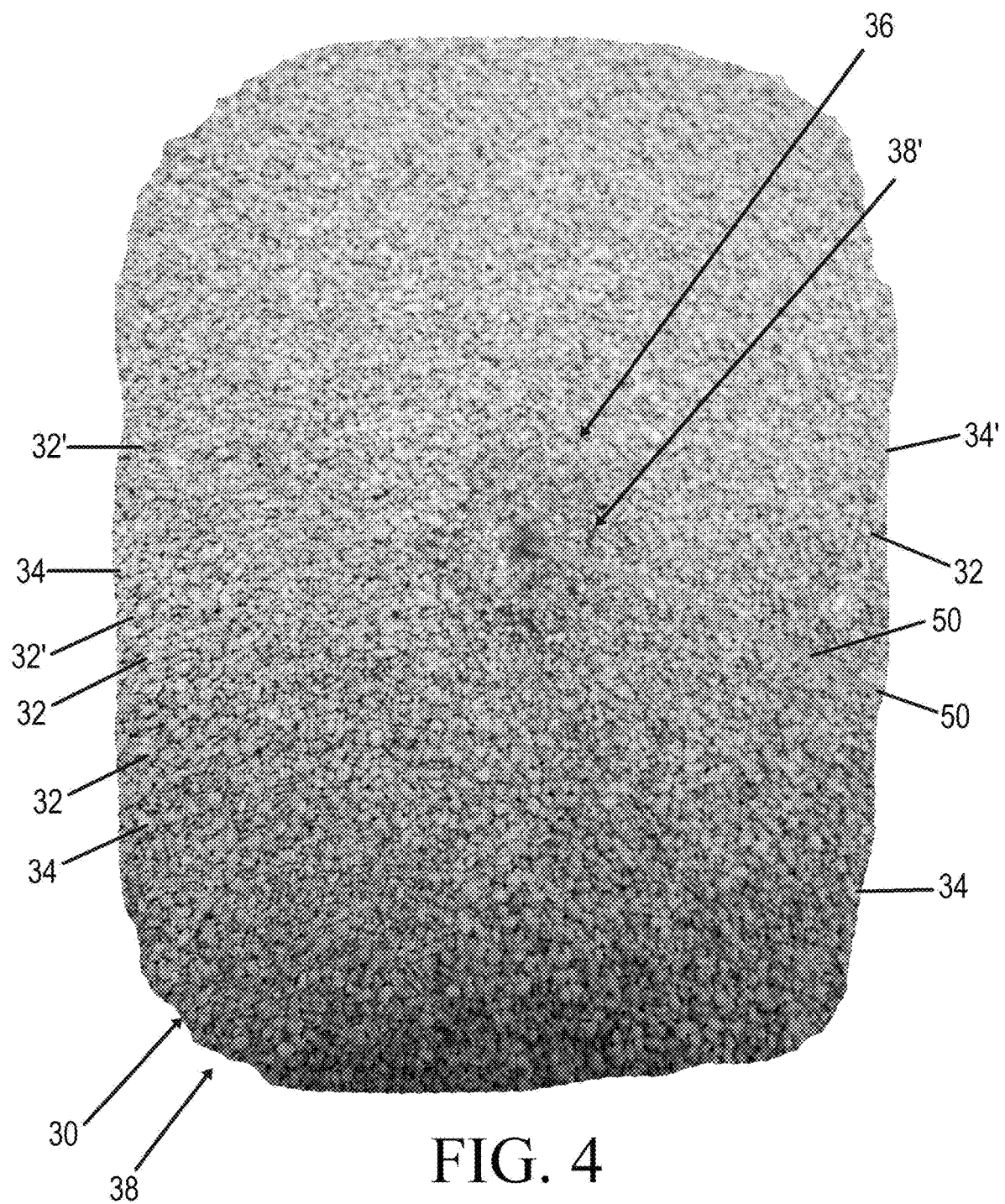
FIG. 4 is an enlarged color photo of extruded granular sorbent formed of a plurality of pairs of extruded sorbent granules in a litter box being wetted and beginning to form a clump where the extruded sorbent granules have a plurality of different granule size ranges causing the clump to form on top of the granules making scooping of the formed clump easy.

With additional reference to FIGS. 4-7, when a liquid, such as the stream of water 50, e.g., 2% saline solution, or urine, shown in FIG. 4 being poured onto unspent or unused litter pellets 34 of litter 30 of the present invention, the litter pellets 34 wetted by the water 50 not only substantially completely absorb the water 50 but solubilize water-soluble binder in each pellet 34 causing a clump 36 (FIGS. 5-6) of at least a plurality of pairs, i.e. at least three, of wetted granules 32 to form. As a result of the partially dissolving enhanced liquid absorption extruded litter pellet construction of the present invention, the result clump 36 formed is produced by unspent or unused extruded litter pellets 34 rapidly absorbing between one time and four times unspent or unused extruded litter pellet weight in water, e.g., 2% saline solution, or urine within three minutes, preferably within two minutes, of pellet wetting relatively rapidly forming a scoopable clump within three minutes, preferably within two minutes of pellet wetting.

Figure 5:
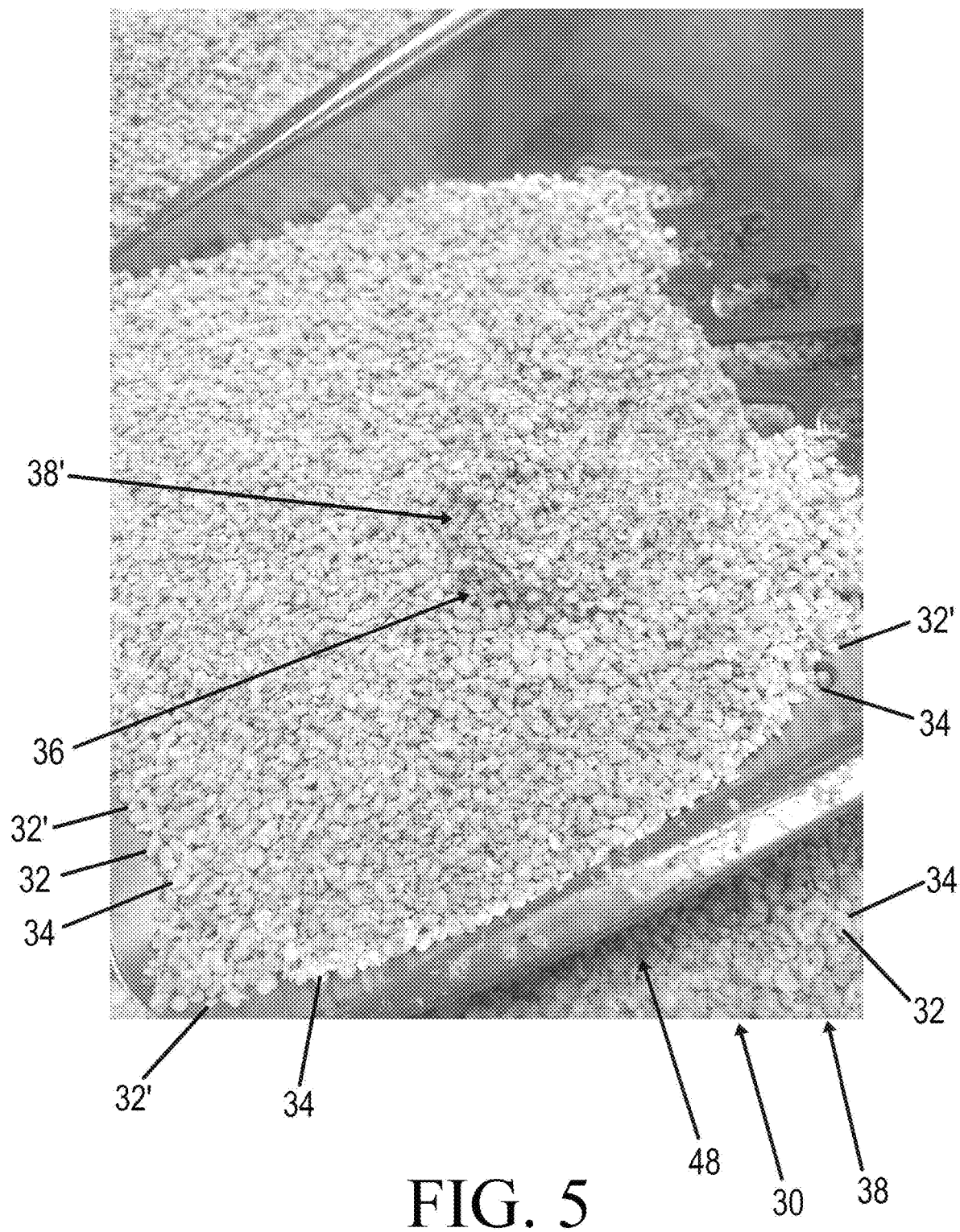
FIG. 5 is an enlarged color photo of the clump of FIG. 4 after being formed during scooping of the clump using a perforate litter scoop.
Figure 6:
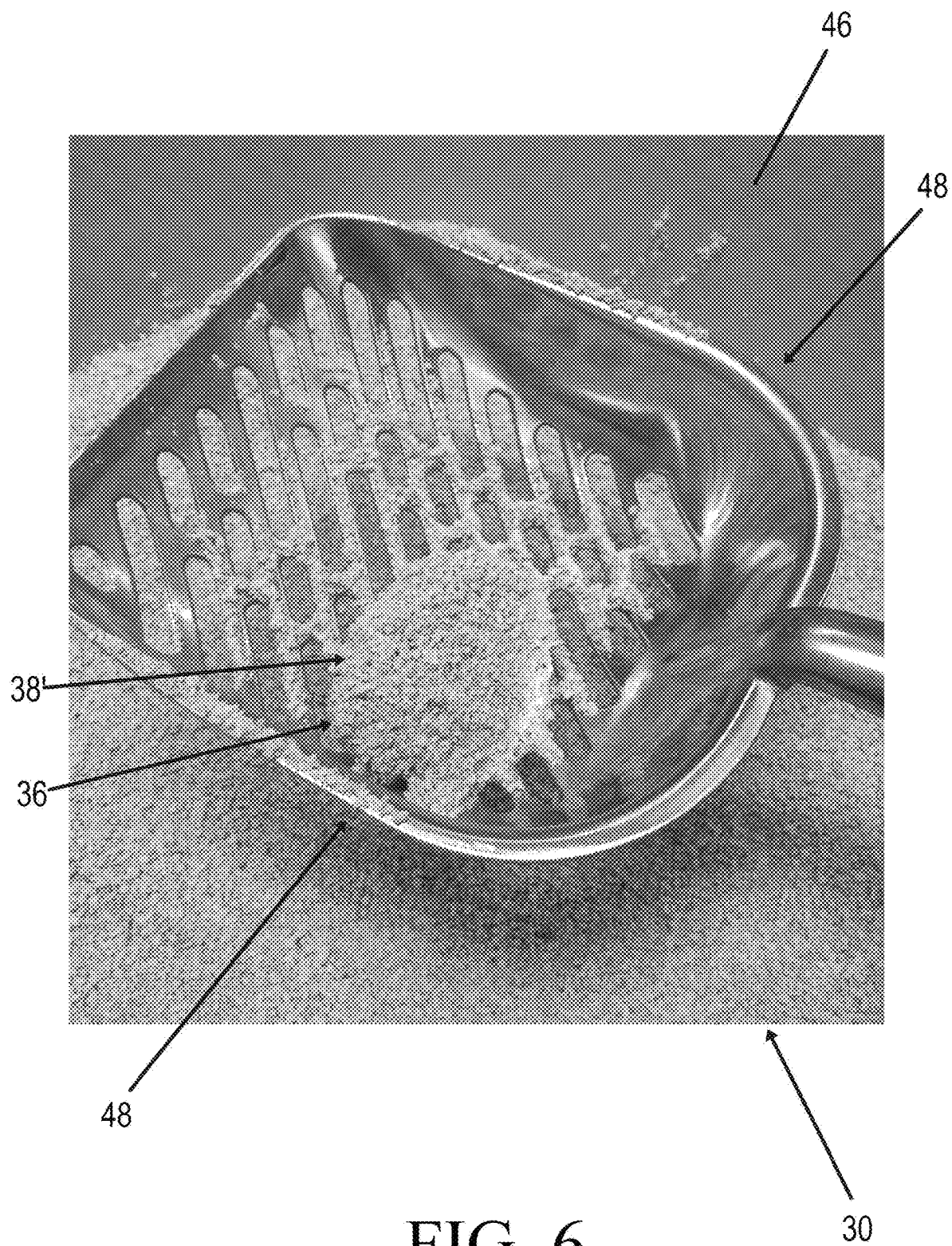
FIG. 6 is an enlarged color photo of the clump of FIG. 4 after being lifted by the scoop from the unused sorbent granules in the litter box.

With reference to FIG. 5, when clump formation is complete in as little as 30 seconds to three minutes, a discrete clump 36 of litter pellets 34 of spent litter 38' is formed that can be removed using a perforate litter scoop 48 from the unspent litter 38 remaining in the litter box 46 (FIG. 6). What remains after scooping is a fully formed clump 36 of spent litter 38' that can be easily disposed of In a preferred embodiment, such a clump 36 formed of pellets 34 of spent litter 38' is biodegradable and preferably toilet flushable.

With continued reference to FIGS. 1-7, a preferred embodiment of litter 30 in accordance with the present invention is composed of at least a plurality of differently sized extruded litter pellets 34, 34' which facilitate absorption of liquid during litter use by more quickly and efficiently absorbing liquid wetting the pellets 34, 34' by wetting and being absorbed by the pellets 34, 34' while also minimizing how deeply the liquid flows downwardly into the litter 30 before being completely absorbed by the pellets 34, 34'. The use of at least a plurality of differently sized extruded litter pellets 34, 34' produces litter 30 that clumps when wetted producing a clump 36 of a plurality of wetted extruded litter pellets 34, 34' that forms on top of the litter 30 with the clump 36 being generally horizontally oriented on top of the litter 30 making the clump 36 easy to scoop from the rest of the unspent litter 38.

Such a preferred litter 30 of the present invention has at least a plurality of pairs of larger extruded litter pellets 34 per cubic inch of litter 30 falling within a first size range and at least a plurality of pairs of more finely sized extruded litter pellets 34', e.g., fines, per cubic inch of litter 30 falling within a second size range that is smaller than the larger extruded litter pellets 34. In a preferred embodiment, the larger sized pellets 34 have a size falling within a first size range each having a size no greater than 3 mm in length, width and/or diameter and no smaller than 1 mm in length, width and/or diameter. The smaller sized pellets 34', also referred to as fines 34', have a size smaller than 1 mm in length, width and/or diameter filling in the spaces or voids between the larger pellets 34 in a resultant litter 30 formed of a mixture thereof. In one such preferred embodiment, extruded litter pellets 34 having a size larger than 3 mm in in length, width and/or diameter are not included in the resultant litter mixture of the present invention such as by filtering, screening or sieving such unwanted extruded pellets that are too large. In another such preferred embodiment, extruded litter pellets 34' having a size smaller than 0.5 mm in in length, width and/or diameter are not included in the resultant litter mixture of the present invention such as by filtering, screening or sieving to eliminate or otherwise remove such unwanted extruded pellets that are too small. In still another such preferred embodiment, extruded litter pellets 34 having a size larger than 3 mm in in length, width and/or diameter and extruded litter pellets 34' having a size smaller than 0.5 mm in in length, width and/or diameter are not included in the resultant litter mixture of the present invention.

In another preferred embodiment, the larger sized pellets 34 have a size falling within a first size range each having a size no greater than about 2.8 mm in length, width and/or diameter and no smaller than 1.2 mm, preferably no smaller than about 1.18 mm, in length, width and/or diameter. The smaller sized pellets 34', also referred to as fines 34', have a size smaller than 1.2 mm, preferably smaller than about 1.180 mm, in length, width and/or diameter filling in the spaces or voids between the larger pellets 34 in a resultant litter 30 formed of a mixture thereof. In one such preferred embodiment, extruded litter pellets 34 having a size larger than about 2.8 mm in in length, width and/or diameter are not included in the resultant litter mixture of the present invention such as by filtering, screening or sieving such unwanted extruded pellets that are too large. In another such preferred embodiment, extruded litter pellets 34' having a size smaller than about 0.8 mm, preferably smaller than about 0.710 mm in in length, width and/or diameter are not included in the resultant litter mixture of the present invention such as by filtering, screening or sieving to eliminate or otherwise remove such unwanted extruded pellets that are too small. In still another such preferred embodiment, extruded litter pellets 34 having a size larger than about 2.8 mm in in length, width and/or diameter and extruded litter pellets 34' having a size smaller than about 0.710 mm in in length, width and/or diameter are not included in the resultant litter mixture of the present invention.

In still another preferred embodiment, the larger sized pellets 34 have a size falling within a first size range each having a size no greater than 2.9 mm, preferably no greater than about 2.8 mm, in length, width and/or diameter and no smaller than 1.2 mm, preferably no smaller than about 1.18 mm, in length, width and/or diameter. The smaller sized pellets 34', also referred to as fines 34', have a size smaller than 1.2 mm, preferably smaller than about 1.180 mm, in length, width and/or diameter and have a size larger than 0.5 mm, preferably larger than about 0.710 mm, in length, width and/or diameter thereby filling in the spaces or voids between the larger pellets 34 in a resultant litter 30 formed of a mixture thereof.

A preferred extruded self-clumping litter 30 has at least 15% fines 34', preferably has at least 20% fines 34', with the remainder of the extruded pellets of the litter 30 being larger sized pellets 34. Another preferred extruded self-clumping litter 30 has at least 5% fines 34' and preferably has between 5% and 40% fines 34', with the remainder of the extruded pellets 34 being larger sized extruded pellets. Still another preferred extruded self-clumping litter 30 has at least 5% fines 34' and preferably has between 10% fines 34' and preferably has between 10% and 30% fines 34', with the remainder of the pellets of the litter 30 being larger sized pellets 34. Still preferred extruded self-clumping litter 30 has at least 5% fines 34' and preferably has between 5% and 40% fines 34', with the remainder of the extruded pellets being larger sized pellets 34. Still another preferred extruded self-clumping litter 30 has at least 5% fines 34', preferably has between 10% and 25% fines 34', and more preferably has between 15% and 35% fines 34', with the remainder of the extruded pellets being larger sized pellets 34.

As a result, liquid wetting the extruded litter pellets 34, 34' during litter use is more rapidly absorbed at or close to the surface of the litter 30 preventing the liquid from flowing deeper producing clumps 36 on top of the surface of the litter 30 that are generally horizontally oriented. As a result, such clumps 36 lie on top of the surface of the litter 30 making them quick and easy to scoop out of the rest of the unspent litter remaining in the litter box and dispose of.

Each extruded litter pellet 34 and/or 34' preferably is extruded using a single screw extruder from a starch-containing admixture formed of one or more cereal grains, such as one or more of corn, wheat, sorghum, rice or another cereal grain, which can be ground or otherwise comminuted prior to extrusion, extruding pellets 34 and/or 34' each having enough water soluble binder to cause litter 30 composed of a mixture of medium sized pellets 34 and more finely sized pellets 34' of the present invention to self-clump when wetted with water, e.g., 2% saline solution, urine, and/or liquid fecal matter. In a preferred method of making such extruded pellets 34 and/or 34' each pellet 34 and/or 34' is extruded from such a starch-containing admixture that preferably is composed of one or more cereal grains under an extruder pressure and temperature operating parameters and conditions that produce extruded pellets 34 and/or 34' each containing at least 15% water solubles, e.g., at least 15% water soluble content, by extruded pellet weight and each containing at least 7.5% water soluble binder, preferably at least 10% water soluble binder, by extruded pellet weight with at least the water soluble binder preferably formed by physical modification of starch in the admixture during pellet extrusion in accordance with that discussed hereinabove.

In one preferred method, the admixture extruded to form the pellets 34 and/or 34' has a moisture content of no greater than 30%, preferably no more than 25%, by admixture weight before entering the extruder. In one such preferred method, no water or other moisture is added during extrusion. In one preferred admixture, the admixture is formed of at least 60% corn, preferably at least 70% corn, preferably cornmeal, by admixture weight, e.g., dry admixture weight, which can be de-germed, having a moisture content of no greater than 30%, preferably no greater than 25%, by admixture weight when entering the extruder. Such an admixture can include as much as 40%, preferably no greater than 30% cellulosic material, such as in the form of plant fiber, pine fiber, oat fiber, wheat fiber, alfalfa, sawdust, recycled newsprint, or another type of cellulosic material. In another preferred admixture, the admixture preferably is formed of at least 60% sorghum, preferably at least 70% sorghum, by admixture weight, e.g., dry admixture weight, which can be and preferably is whole grain sorghum, which can be de-hulled or de-corticated, having a moisture content no greater than 20%, preferably no greater than 15%, by admixture weight when entering the extruder. Such an admixture can also include as much as 40%, preferably no greater than 30% cellulosic material, such as in the form of plant fiber, pine fiber, oat fiber, wheat fiber, alfalfa, sawdust, recycled newsprint, or another type of cellulosic material.

Another such preferred admixture from which extruded pellets 34 and/or 34' are formed includes one or more cereal grains, preferably one or more of corn, sorghum and/or wheat, can include a gray or black dye or colorant, preferably carbon black, preferably no more than 5% carbon black, more preferably no more than 1% carbon black (by admixture weight), and can include cellulose, such as in the form of one or more cellulosic materials and/or cellulose-containing fibers. A preferred admixture contains at least 50% starch containing material in the form of one or more cereal grains and preferably contains no more than 50% cellulose by admixture weight. A preferred starch containing material is formed of at least 50% corn, preferably at least 60%, and more preferably at least 70% by dry admixture weight (before any water is added to the admixture) preferably in comminuted form, such as preferably in the form of cornmeal that can include and preferably does include de-germed cornmeal. Where the admixture includes cellulose or cellulosic material, the remainder of the admixture can be composed of preferred cellulose and cellulosic materials that include one or more of sawdust, pine shavings or fibers, other types of wood shavings or fibers, oat fiber, alfalfa, rice fiber, beet fiber or another type of cellulose or cellulosic fiber. Such an admixture preferably contains no separate binder additive like guar gum, smectite, e.g., bentonite, or the like added specifically to facilitate clumping. One such preferred admixture contains no more than 40% cellulose or cellulosic material, e.g., fiber, with the remainder of the admixture composed substantially completely of one or more cereal grains with no more than 5%, preferably no more than 1% carbon black, by admixture weight.

In a preferred method of extruding pellets 34 and/or 34' from such admixtures, the admixture is extruded using a single screw extruder at an extruder pressure of at least 900 pounds per square inch and at a temperature of at least 100° Celsius extruding at least a plurality of pairs of extruded pellets 34, 34' per second of extruder operation with each extruded pellet 34 and/or 34' having a water soluble content of at least 15%, preferably at least 20%, by extruded pellet weight containing at least 7.5%, preferably at least 10%, water soluble binder by extruded pellet weight. In another preferred method of extruding pellets 34 and/or 34' from such admixtures, the admixture is extruded using a single screw extruder at an extruder pressure of at least 1,000 pounds per square inch and at a temperature of at least 120° Celsius extruding at least a plurality of pairs of extruded pellets 34 and/or 34' per second of extruder operation with each extruded pellet 34 and/or 34' having a water soluble content of at least 15%, preferably at least 18%, by pellet weight containing at least 7.5%, preferably at least 10%, more preferably at least 12%, water soluble binder by pellet weight. In still another preferred method of extruding pellets 34 from such admixtures, the admixture is extruded using a single screw extruder at an extruder pressure of at least 1,100 pounds per square inch and at a temperature of at least 130° Celsius extruding at least a plurality of pairs of extruded pellets 34 and/or 34' per second of extruder operation with each extruded pellet 34 and/or 34' having a water soluble content of at least 15%, preferably at least 18%, more preferably at least 20% by pellet weight containing at least 7.5%, preferably at least 10%, more preferably at least 15%, water soluble binder by pellet weight. In a further preferred method of extruding pellets 34 and/or 34' from such admixtures, the admixture is extruded using a single screw extruder at an extruder pressure of at least 1,200 pounds per square inch and at a temperature of at least 135° Celsius extruding at least a plurality of pairs of extruded pellets 34 and/or 34' per second of extruder operation with each extruded pellet 34 and/or 34' having a water soluble content of at least 18%, preferably at least 20%, more preferably at least 25% by pellet weight containing at least 8%, preferably at least 12%, more preferably at least 18%, water soluble binder by pellet weight.

The water soluble binder formed in each pellet 34 and/or 34' during extrusion preferably is a cold water soluble binder formed from starches in a starch containing admixture preferably forming at least 7.5% cold water soluble binder, preferably at least 10% cold water soluble binder, and more preferably at least 15% cold water soluble binder in each pellet 34 and/or 34' by pellet weight. Where cold water soluble binder is formed in each pellet 34 and/or 34' during extrusion, cold water soluble amylopectin binder preferably is formed from amylopectin starch in such a starch containing admixture preferably forming at least 7.5% cold water soluble amylopectin binder, preferably at least 10% cold water soluble amylopectin binder, and more preferably at least 15% cold water soluble amylopectin binder in each pellet 34 and/or 34' by pellet weight. In at least one preferred extruded pellet embodiment, each extruded pellet 34 and/or 34' has at least 15%, preferably at least 18%, and more preferably at least 20% cold water soluble amylopectin binder by pellet weight.

Where cold water soluble amylopectin-based binder is formed in each pellet 34 and/or 34' during extrusion, the cold water soluble amylopectin binder can be or include amorphous cold water soluble amylopectin binder formed from amylopectin starch in such a starch containing admixture preferably forming at least 7.5% amorphous cold water soluble amylopectin binder, preferably at least 10% amorphous cold water soluble amylopectin binder, and more preferably at least 15% amorphous cold water soluble amylopectin binder in each pellet 34 and/or 34' by pellet weight. In one such preferred extruded pellet embodiment where amorphous cold water soluble amylopectin binder is formed during pellet extrusion, each pellet 34 and/or 34' has at least 15%, preferably has at least 18%, and more preferably has at least 20%, amorphous cold water soluble amylopectin binder by pellet weight.

The amount of water solubles or water soluble content of each extruded pellet 34 and/or 34' is specified in terms of a percentage of the extruded pellet weight indicating what weight percentage of the pellet 34 and/or 34' is composed of modified starch, preferably starch modified during pellet extrusion, more preferably physically modified during extrusion, which is water soluble when wetted with water, e.g., 2% saline solution, and/or urine at a temperature below which it is cold water soluble as known in the field of starch chemistry. In a preferred embodiment, the amount of water solubles or water soluble content of each extruded pellet 34 and/or 34' is specified in terms of a percentage of the extruded pellet weight indicating what weight percentage of the pellet 34 and/or 34' is composed of modified starch, preferably starch modified during pellet extrusion, more preferably physically modified during extrusion, which is water soluble when wetted with water, e.g., 2% saline solution, and/or urine at a temperature below 160 degrees Celsius such that it is cold water soluble as known in the field of starch chemistry.

The cold water soluble binder present in the extruded pellets 34 and/or 34' of litter 30 of the present invention advantageously therefore remains cold water soluble at temperatures below 110° Fahrenheit providing real world urine solubility by dissolving in liquid at temperatures as high as 110° Fahrenheit, including dissolving when wetted with or by cat urine that typically has a temperature no higher than about 108° Fahrenheit. The cold water soluble content of each extruded pellet 34 and/or 34' includes starch from the one or more cereal grains in the admixture modified during extrusion, preferably by being physically modified during extrusion, to become water-soluble, preferably cold water soluble, and includes amylopectin in the admixture modified during extrusion into cold water soluble amylopectin. The water soluble content of each extruded pellet 34 and/or 34' is inclusive of any water soluble binder present in the extruded pellet 34 and/or 34'.

Figure 7:
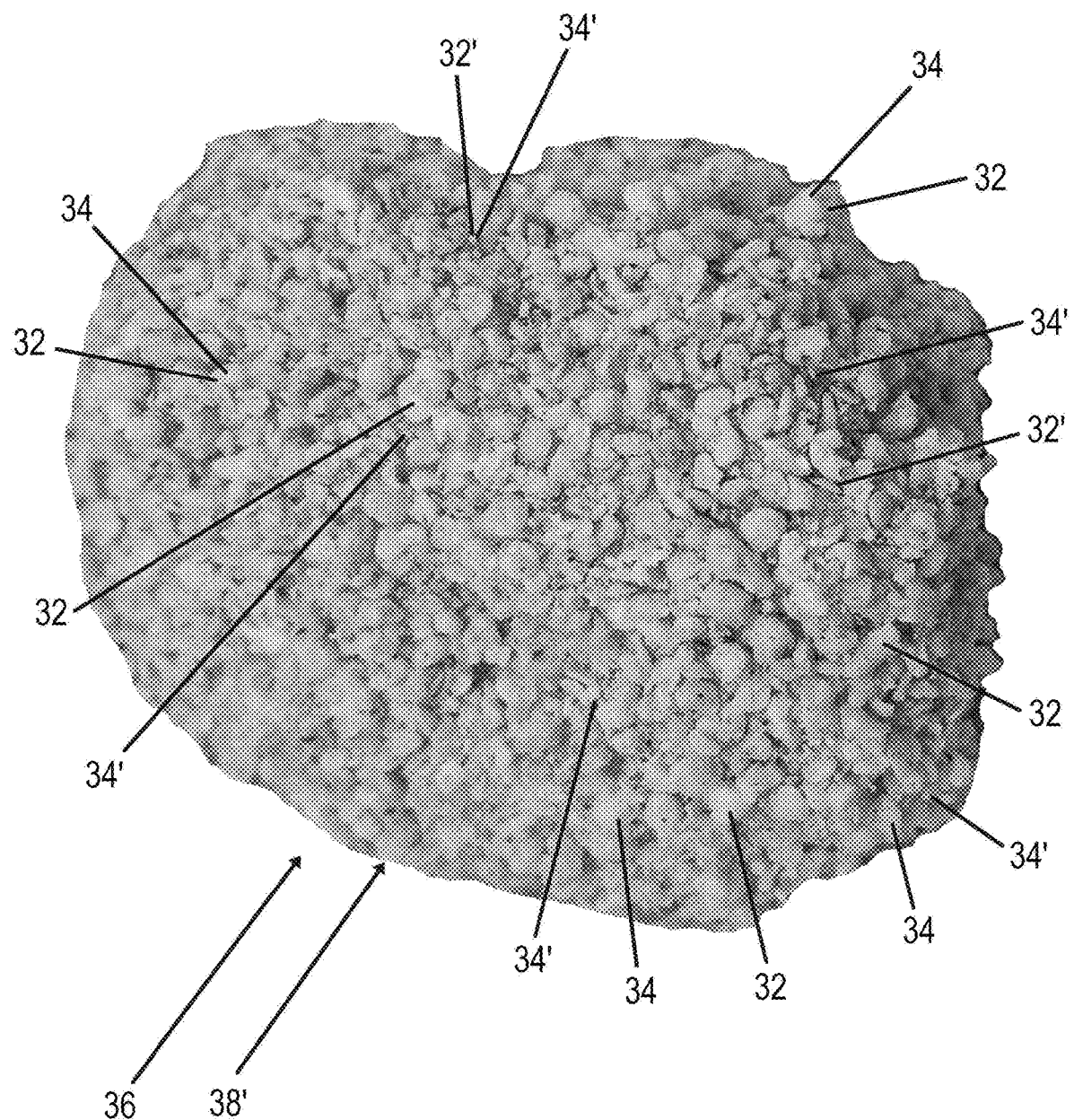
FIG. 7 is an enlarged color photo of the clump of FIG. 4 after all of the unused sorbent granules have been removed.

During granular sorbent use, wetting of at least a plurality of pairs, i.e. at least three, of extruded litter pellets 34, 34' of a preferred mixture of litter 30 of the present invention with water, preferably 2% saline solution at room temperature e.g. between 68° F. and 74° F., forms a clump 36, such as shown in FIGS. 6 and 7, containing at least a plurality of pairs, i.e., at least three, of wetted pellets 34 and wetted pellets 34' that self-clump together as a result of water soluble binder in each of the wetted pellets 34, 34' solubilizing and making each wetted pellet 34 and 34' tacky enough to stick to one or more pellets 34 and/or 34' in contact therewith. In a preferred litter embodiment, the litter 30 is formed of at least a plurality of pairs of extruded pellets 34 and of at least a plurality of pairs of extruded pellets 34' each having water-soluble binder in an amount sufficient for at least some of the binder to solubilize and flow from the wetted pellets 34 and 34' in between and around at least a plurality of adjacent pellets 34 and/or 34'. Water-soluble binder of a plurality of wetted pellets 34 and a plurality of wetted pellets 34' that has solubilized and formed flowable adhesive with water, e.g. 2% saline solution, wets the pellets 34 and pellets 34' relatively rapidly forming clump 36 as the flowable adhesive formed by the water in solubilize binder rapidly increases in viscosity immediately upon the pellets 34 and 34' being wetted with the water.

In a preferred embodiment, during wetting of such a plurality of pairs of pellets 34 and 34' where 400 grams of extruded pellets 34 and 34' are wetted with 200 grams of water, e.g., 2% saline solution, at room temperature, e.g., between 68° F. and 74° F., the viscosity at pellet wetting or at the beginning of pellet wetting as measured with a Brookfield DV3T viscometer at a spindle rotation of 50 RPM rapidly increases from about 1 centipoise at wetting as the water solubilizes water-soluble binder in each wetted pellet 34 and 34' forming a flowable adhesive whose viscosity increases to at least 200 centipoise within one second after pellet wetting, increases to at least 300 centipoise after one second and within five seconds after pellet wetting, increases to at least 400 centipoise after five seconds and within 10 seconds of pellet wetting such that the water in solubilizing water-soluble binder forms a relatively high viscosity flowable adhesive gel that relatively rapidly adheres together the at least plurality of pairs of wetted pellets 34 and 34' forming clump 36. In another preferred embodiment, during wetting of such a plurality of pairs of pellets 34 and 34' where 200 grams of extruded pellets 34 and 34' are wetted with 200 grams of water, e.g., 2% saline solution, at room temperature, the viscosity at pellet wetting or at the beginning of pellet wetting as measured with a Brookfield DV3T viscometer at a spindle rotation of 50 RPM rapidly increases from about 1 centipoise at the time of initial pellet wetting as the water solubilizes water-soluble binder in each wetted pellet 34 and 34' forming a flowable adhesive whose viscosity increases to at least 400 centipoise within one second after pellet wetting, increases to at least 500 centipoise after one second and within five seconds after pellet wetting, increases to at least 700 centipoise after five seconds and within 10 seconds of pellet wetting, increases to at least 1000 centipoise after 10 seconds and within 20 seconds of pellet wetting, increases to at least 1800 centipoise after 20 seconds and within 25 seconds of pellet wetting, increases to at least 2500 centipoise after 25 seconds and within 30 seconds of pellet wetting, increases to at least 5000 centipoise after 30 seconds and within 40 seconds of pellet wetting such that the water in solubilizing water-soluble binder forms a relatively high viscosity flowable adhesive gel that relatively rapidly adheres together the at least plurality of pairs of wetted pellets 34 and 34' forming clump 36.

A preferred extruded pellet 34 and/or 34' is formed by extruding an admixture containing one or more cereal grains, preferably one or more of corn, sorghum and/or wheat, without any separate binder additive or smectite in the admixture, at such aforementioned extruder pressures and/or temperatures with such extruder pressures and/or temperatures extruding pellets 34 and/or 34' that are dextrinized and which can be expanded or puffed with each pellet 34 and/or 34' having at least 15% water soluble content by pellet weight and at least 7.5% water soluble binder content by pellet weight sufficient to not only facilitate liquid absorption when wetted during sorbent use but which also self-clump together forming clumps, e.g. clump 36, when wetted during sorbent use. Another preferred extruded pellet 34 and/or 34' is formed by extruding such an admixture containing one or more cereal grains, preferably one or more of corn, sorghum and/or wheat, without any separate binder additive or smectite such as bentonite in the admixture, at an extruder temperature and pressure at or above which it is sufficient to extrude pellets 34 and/or 34' each having at least 15% water soluble content by pellet weight and at least 7.5%, preferably at least 10%, water soluble binder content by pellet weight. Still another preferred extruded pellet 34 and/or 34' is formed by extruding such an admixture containing one or more cereal grains, preferably one or more of corn, sorghum and/or wheat, without any separate binder additive or smectite, including bentonite, in the admixture, at an extruder temperature and pressure at or above which it is sufficient to extrude pellets 34 and/or 34' each having at least 18% water soluble content by pellet weight and at least 10%, preferably at least 12%, water soluble binder content by pellet weight. A further preferred extruded pellet 34 and/or 34' is formed by extruding such an admixture containing one or more cereal grains, preferably one or more of corn, sorghum and/or wheat, without any separate binder additive or smectite, such as bentonite, in the admixture, at an extruder temperature and pressure at or above which it is sufficient to extrude pellets 34 and/or 34' each having at least 20% water soluble content by pellet weight and at least 12%, preferably at least 15%, water soluble binder content by pellet weight. A still further preferred extruded pellet 34 and/or 34' is formed by extruding an admixture containing one or more cereal grains, preferably one or more of corn, sorghum and/or wheat, without any separate binder additive or smectite, including bentonite, in the admixture, at an extruder temperature and pressure at or above which it is sufficient to extrude pellets 34 and/or 34' each having at least 25% water soluble content by pellet weight and at least 10%, preferably at least 15%, and more preferably at least 18%, water soluble binder content by pellet weight. Yet another preferred extruded pellet 34 and/or 34' is formed by extruding an admixture containing one or more cereal grains, preferably one or more of corn, sorghum and/or wheat, without any separate binder additive or smectite in the admixture, at an extruder temperature and pressure at or above which it is sufficient to extrude pellets 34 and/or 34' each having at least 25% water soluble content by pellet weight and at least 15%, preferably at least 18%, and more preferably at least 20%, water soluble binder content by pellet weight.

The water soluble content of each extruded pellet 34 and/or 34' preferably is composed of amorphous cold water soluble amylopectin material and the water soluble binder content of each extruded pellet 34 and/or 34 preferably is formed of amorphous cold water soluble amylopectin binder having a molecular weight less than that of the unmodified amylopectin starch of the cereal grain or cereal grains of the admixture from which each pellet 34 and/or 34' was extruded. In a preferred extruded pellet embodiment, the water soluble content of each extruded pellet 34 and/or 34' preferably is composed of amorphous cold water soluble amylopectin material and the water soluble binder content of each extruded pellet 34 and/or 34' preferably is formed of amorphous cold water soluble amylopectin binder having a molecular weight less than that of the unmodified amylopectin starch of the cereal grain or cereal grains of the admixture from which each pellet 34 and/or 34' was extruded and preferably a mean molecular weight within ±80% of the mean molecular weight of the unmodified amylose starch of the cereal grain or cereal grains of the admixture from which each pellet 34 and/or 34' was extruded.

Each extruded pellet 34 and/or 34' can and does have at least 3%, preferably at least 5%, of a dextrin-like water soluble adhesive binder by pellet weight that preferably is a cold water soluble adhesive binder having a mean molecular weight within ±90% of the mean or average molecular weight of dextrin. In a preferred extruded pellet embodiment, each pellet 34 and/or 34' has at least 3%, preferably at least 5%, of a dextrin-like cold water soluble binder, i.e., dextrin, by pellet weight that has a molecular weight within ±90% of 504.43708 g/mol, which is the CAS molecular weight of dextrin. In another preferred extruded pellet embodiment, each pellet 34 and/or 34' has at least 3% dextrin and preferably has at least 5% dextrin by pellet weight.

A preferred extruded pellet 34 and/or 34'is formed by extruding an admixture containing one or more cereal grains, preferably one or more of corn, sorghum and/or wheat, at an admixture moisture content of no greater than 30%, preferably with no water added in the extruder during extrusion from a single screw extruder at an extruder temperature of at least 100° Celsius and an extruder pressure of at least 900 pounds per square inch to extrude a plurality of extruded pellets 34 and/or 34' per second of extruder operation with each extruded pellet 34 and/or 34' having a water soluble content of at least 15% by pellet weight containing at least 7.5% water soluble binder by pellet weight. Another preferred extruded pellet 34 and/or 34' is formed by extruding an admixture containing one or more cereal grains, preferably one or more of corn, sorghum and wheat, at an admixture moisture content of no greater than 25%, preferably with no water added in the extruder during extrusion at an extruder temperature of at least 120° Celsius and an extruder pressure of at least 1,000 pounds per square inch to extrude a plurality of extruded pellets 34 and/or 34' per second of extruder operation with each extruded pellet 34 and/or 34' having a water soluble content of at least 18% by pellet weight containing at least 10% water soluble binder by pellet weight. Still another preferred extruded pellet 34 and/or 34' is formed by extruding an admixture containing one or more cereal grains, preferably one or more of corn, sorghum and wheat, at an admixture moisture content of no greater than 23%, preferably with no water added in the extruder during extrusion at an extruder temperature of at least 125° Celsius and an extruder pressure of at least 1,100 pounds per square inch to extrude a plurality of extruded pellets 34 and/or 34' per second of extruder operation with each extruded pellet 34 and/or 34' having a water soluble content of at least 20% by pellet weight containing at least 13%, preferably at least 15%, and more preferably at least 18%, water soluble binder by pellet weight.

Each extruded pellet 34 and/or 34' can be and preferably is composed of or with at least 3%, preferably at least 5%, more preferably at least 7.5%, of a dextrin-like water soluble adhesive binder by pellet weight that preferably is a cold water soluble adhesive binder having a mean molecular weight within ±90% of the mean or average molecular weight of dextrin. In a preferred extruded pellet embodiment, each pellet 34 and/or 34' has at least 3%, preferably at least 5%, more preferably at least 7.5%, of a dextrin-like cold water soluble binder having a molecular weight within ±90% of 504.43708 g/mol. In another preferred extruded pellet embodiment, each pellet 34 and/or 34' has at least 3% dextrin by pellet weight, preferably has at least 5% dextrin by pellet weight, and more preferably has at least 7.5% dextrin by pellet weight.

A preferred extruded pellet 34 and/or 34' used as or in making litter 30 of the present invention is extruded from one or more cereal grains and has at least 15% cold water soluble content by pellet weight and preferably has at least 7.5%, preferably at least 10%, more preferably at least 13%, cold water soluble binder content by pellet weight with the water soluble binder content present in each pellet 34 and/or 34' preferably being cold water soluble modified amylopectin starch binder that preferably is an amorphous cold water soluble amylopectin starch binder. Preferably, each pellet 34 and/or 34'has at least 15% cold water solubles by pellet weight and at least 7.5%, preferably at least 10%, more preferably at least 13%, cold water soluble binder formed of cold water soluble amylopectin starch binder, preferably cold water soluble amorphous amylopectin starch binder, formed of amylopectin starch modified so its molecular weight has been reduced to a molecular weight below $10^6$, e.g., $10^6$ g/mol. In another preferred embodiment, each pellet 34 and/or 34' has a cold water soluble content of at least 15% by pellet weight and a cold water soluble amylopectin starch binder content of at least 7.5%, preferably at least 10%, more preferably at least 13%, formed of reduced molecular weight physically modified amylopectin having a degree of polymerization of less than 6,000 glucose units, preferably less than 3,000 glucose units, more preferably less than 1,000 glucose units. In yet another such preferred embodiment, each pellet 34 and/or 34' has a cold water soluble content of at least 15% by pellet weight and a cold water soluble amylopectin starch binder content of at least 7.5%, preferably at least 10%, more preferably at least 13%, formed of reduced molecular weight physically modified amylopectin having a degree of polymerization falling between 6,000 and 10 glucose units. In a further such preferred embodiment, each pellet 34 and/or 34' has a cold water soluble content of at least 15% by pellet weight and a cold water soluble amylopectin starch binder content of at least 7.5%, preferably at least 10%, more preferably at least 13%, formed of reduced molecular weight physically modified amylopectin having a degree of polymerization falling between 500 and 10 glucose units. In one such preferred embodiment, each pellet 34 and/or 34' has a cold water soluble content of at least 15% by pellet weight and a cold water soluble amylopectin starch binder content of at least 7.5%, preferably at least 10%, more preferably at least 13%, formed of reduced molecular weight modified amylopectin having a molecular weight no greater than $10^6$ g/mol and a degree of polymerization falling between 10 and 6,000 glucose units. In another such preferred embodiment, each pellet 34 and/or 34' has a cold water soluble content of at least 15% by pellet weight and a cold water soluble amylopectin starch binder content of at least 7.5%, preferably at least 10%, more preferably at least 13%, formed of reduced molecular weight modified amylopectin having a molecular weight no greater than $10^6$ g/mol and a degree of polymerization falling between 10 and 500 glucose units.

Another preferred extruded pellet 34 and/or 34' is extruded from one or more cereal grains and has at least 20% cold water soluble content by pellet weight and preferably has at least 15%, preferably at least 18%, more preferably at least 20%, cold water soluble binder content by pellet weight with the water soluble binder content present in each pellet 34 and/or 34' preferably being cold water soluble modified amylopectin starch binder that preferably is an amorphous cold water soluble amylopectin starch binder. Preferably, each pellet 34 and/or 34' has at least 25% cold water solubles by pellet weight and at least 15%, preferably at least 18%, more preferably at least 23%, cold water soluble binder formed of cold water soluble amylopectin starch binder, preferably cold water soluble amorphous amylopectin starch binder, formed of amylopectin starch modified so its molecular weight has been reduced to a molecular weight no greater than $10^6$, e.g., $10^6$ g/mol. In another preferred embodiment, each pellet 34 and/or 34' has a cold water soluble content of at least 20% by pellet weight and a cold water soluble amylopectin starch binder content of at least 15%, preferably at least 18%, more preferably at least 20%, formed of reduced molecular weight modified amylopectin having a degree of polymerization falling between 10 and 6,000 glucose units. In yet another preferred embodiment, each pellet 34 and/or 34' has a cold water soluble content of at least 20% by pellet weight and a cold water soluble amylopectin starch binder content of at least 15%, preferably at least 18%, more preferably at least 20%, formed of reduced molecular weight modified amylopectin having a degree of polymerization falling between 10 and 500 glucose units. In one such preferred embodiment, each pellet 34 and/or 34' has a cold water soluble content of at least 25% by pellet weight and a cold water soluble amylopectin starch binder content of at least 15%, preferably at least 18%, more preferably at least 23%, formed of reduced molecular weight modified amylopectin having a molecular weight no greater than $10^6$, e.g., $10^6$ g/mol, and a degree of polymerization falling between 10 and 6,000 glucose units. In another such preferred embodiment, each pellet 34 and/or 34' has a cold water soluble content of at least 25% by pellet weight and a cold water soluble amylopectin starch binder content of at least 15%, preferably at least 18%, more preferably at least 23%, formed of reduced molecular weight modified amylopectin having a molecular weight no greater than $10^6$, e.g., $10^6$ g/mol, and a degree of polymerization falling between 10 and 500 glucose units.

In at least one preferred method of making such extruded pellets 34 and/or 34' in producing extruded litter 30 in accordance with the present invention, such pellets 34 and/or 34' are extruded from an admixture of one or more starch-containing cereal grains contain starch damage in an amount of at least 40%, preferably at least 50%, and more preferably at least 60%, as measured in accordance with AOAC: 2002.02, as substantially all of the cold water soluble amylopectin binder, preferably cold water soluble amorphous amylopectin binder, formed in each extruded pellet 34 and/or 34' is physically modified cold water soluble amylopectin starch binder formed by physically modifying unmodified amylopectin starch present in the cereal grain admixture whose molecular weight is reduced to no greater than $10^6$ forming at least 7.5%, preferably at least 10%, and more preferably at least 13%, of such physically modified cold water soluble amylopectin starch binder that preferably is physically modified amorphous cold water soluble amylopectin starch binder in each pellet 34 and/or 34'. In one such preferred extruded pellet embodiment, each extruded pellet 34 and/or 34' has starch damage in an amount of at least 40%, preferably at least 55%, and more preferably at least 70%, as measured in accordance with AOAC: 2002.02, as the water soluble binder formed in each pellet 34 and/or 34' during pellet extrusion is cold water soluble amylopectin binder, preferably cold water soluble amorphous amylopectin binder, formed in formed of physically modified cold water soluble amylopectin starch binder by physically modifying unmodified amylopectin starch present in the cereal grain admixture whose molecular weight is reduced to no greater than $10^6$ and/or has a degree of a degree of polymerization falling between 10 and 6,000 glucose units, preferably between 10 and 500 glucose units, forming at least 7.5%, preferably at least 10%, and more preferably at least 13%, of such physically modified cold water soluble amylopectin starch binder by pellet weight that preferably is physically modified amorphous cold water soluble amylopectin starch binder.

Each such extruded pellet 34 and/or 34' preferably also has a water activity level of no greater than 0.4, and preferably no greater than 0.35, as such a water activity level is indicative of the advantageous water absorption properties each pellet 34 and/or 34' possesses. In addition, such a lower water activity level is also indicative not only of the long shelf life sorbent granules 32 and/or 32' possess, but also its advantageously long useful sorbent life after being applied or used. This is because litter 30 composed of extruded pellets 34 and/or 34' of the present invention possess desirably high bacterial and fungal resistance as a result of each extruded pellet 34 and/or 34' having such a low water activity level.

Such extruded pellets 34 and/or 34' used in litter 30 of the present invention readily self-clump when wetted producing clumps 36 having a desirably high clump retention rate. In one preferred extruded granular sorbent embodiment, litter 30 formed of such extruded litter pellets 34 and/or 34' of the present invention form clumps 36 of the pellets 34 and/or 34' wetted with ten milliliters of 2% saline solution that each possess a clump retention rate of at least 92%, preferably at least 95%, and more preferably at least 97%, which is greater than the maximum 80%-90% clump retention rate of clumps formed of conventional bentonite-based cat litter (not shown) formed of conventional litter granules (not shown) each made of solid sodium bentonite. In one preferred extruded cat litter 30, extruded litter pellets 34 and/or 34' wetted with ten milliliters of 2% saline solution form clumps 36 that each possess a clump retention rate of at least 98% and which preferably possess a clump retention rate of at least 99%.

In determining such clump retention rates, clump 36 was formed by wetting litter 30 formed of extruded litter pellets 34 and 34' with 10 milliliters of 2% saline solution before allowing the clump 36 to set for 10 minutes. The removed clump 36 is weighed to obtain a pre-drop clump weight before dropping the clump 36 eighteen inches onto a ¾ inch U.S. Standard Sieve. The clump that remains is weighed a second time to obtain a post-drop clump weight that is then divided by the pre-drop clump weight and multiplied by 100 to obtain the clump retention rate. The aforementioned clump retention rate test is also known as a drop cohesion clump strength test.

In one preferred extruded granular sorbent embodiment where a mixture of extruded pellets 34 and 34' are used as litter 30, the extruded pellets 34 and 34' of the mixture of litter 30 readily self-clump when wetted producing clumps 36 having a desirably high retention rate. In one preferred litter 30 formed of a mixture of such extruded pellets 34 and 34' form clumps 36 of pellets 34 and 34' wetted with ten milliliters of 2% saline solution that each possess a clump retention rate of at least 92%, preferably at least 95%, and more preferably at least 97%, which is greater than the maximum 80%-90% clump retention rate of clumps formed of conventional bentonite-based cat litter (not shown) formed of conventional smectite granules (not shown) each made of solid sodium bentonite. In one preferred cat litter 30, litter 30 formed substantially completely of a mixture such extruded pellets 34 and 34' wetted with ten milliliters of 2% saline solution form clumps 36 that each possess a clump retention rate of at least 98% and which preferably possess a clump retention rate of at least 99%.

Such a mixture of extruded pellets 34 and 34' forming cat litter 30 of the present invention readily self-clump when wetted producing clumps 36 also having a desirably high clump crush strength when dry. In addition to forming clumps 36 having such a desirably high retention rate, clumps 36 formed of litter 30 composed of a mixture of pellets 34 and 34' wetted with ten milliliters of 2% saline solution are also advantageously strong and crush-resistant having a crush strength of at least 15 pounds per square inch (PSI), preferably at least 20 PSI, and more preferably at least 25 PSI, when air dried for at least 5 days to a moisture content of no more than 20% by dried clump weight. One preferred mixture of extruded pellets 34 and 34' used as scoopable self-clumping lightweight litter 30 of the present invention forms clumps 36 of litter pellets 34 and 34' wetted with 2% saline solution that each possess a crush strength of at least 28 pounds per square inch (PSI), preferably at least 30 PSI, and more preferably at least 35 PSI, when air dried for at least 5 days to a moisture content of no more than 20% by dried clump weight.

In one preferred litter embodiment where the litter 30 is formed substantially completely of such extruded pellets 34 and/or 34', the extruded pellets 34 and/or 34' readily self-clump when wetted producing clumps 36 also having a desirably high crush strength. In one preferred extruded litter embodiment, litter 30 formed of such extruded pellets 34 and/or 34' form clumps 36 of pellets 34 and/or 34' wetted with ten milliliters of 2% saline solution that each possess a crush strength of at least 15 pounds per square inch (PSI), preferably at least 20 PSI, and more preferably at least 25 PSI, when air dried to a moisture content of no more than 20% by dried clump weight. One preferred cat litter 38 formed substantially completely of such extruded pellets 34 and/or 34' wetted with ten milliliters of 2% saline solution form clumps 36 that each possess a crush strength of at least 30 pounds per square inch (PSI), preferably at least 35 PSI, and more preferably at least 40 PSI, when the clump 36 is dried to a moisture content of no more than 20% by dried clump weight.

Clumps 36 with such a desirably high clump retention rate produced from wetted extruded litter pellets 34 and/or 34' of the present invention retain more of the wetted or spent extruded pellets 34 and/or 34' of spent litter 38' (FIGS. 5 and 6) in the clump 36 thereby advantageously leaving behind less spent or used sorbent granules in litter box 46 (FIG. 6). As a result, litter 30 of the present invention formed of such extruded litter pellets 34 and/or 34' advantageously has a least a 93% litter efficiency, preferably at least a 95% litter efficiency, and more preferably at least a 97% litter efficiency by leaving behind virtually no litter pellets 34 and/or 34' that have been wetted or spent from the clump 36 as virtually all of the spent or wetted pellets 34 and/or 34' are retained by or in the clump 36. This causes a given amount or volume of litter 30 of the present invention to last longer and have less un-clumped wetted or spent litter pellets 34 and/or 34' remaining in the litter 30 after clumping and clump removal, which thereby advantageously maximizes litter freshness, extends useful litter life, and minimizes odor.

Such a litter 30 formed of extruded litter pellets 34 and/or 34' of the present invention advantageously form a "clean" clump 36 during litter use because the water soluble binder from wetted pellets 34 and/or 34' that facilitates clumping by helping wetted pellets 34 and/or 34' stick to one another also shrinks the clump 36 as the clump 36 air dries before being scooped out. By causing each clump 36 to shrink as the wetted lightweight litter pellets 34 and/or 34' dry, clump shrinkage causes the clump 36 to condense in size and create voids between the clump 35 and surrounding unspent pellets 34 and/or 34' of the remaining litter 30 producing a self-separating clump 36 in accordance with the present invention that reduces contamination of unused or un-spent pellets 34 and/or 34' adjacent to and surrounding the clump 36. Where a clump 36 forms adjacent to, on or against a solid surface, such as against a wall or on the bottom of a granular sorbent container, e.g., litter pan or litter box 46, the clump 36 can condense and begin to pull away from the solid surface with which the clump 36 is in contact with. With reference to FIGS. 6 and 7, each clump 36 preferably shrinks at least 3% after being formed from wetted pellets 34 and/or 34' such that each clump 36 shrinks and preferably thereby also condensing the clump 36. When this happens during drying of the clump 36, the clump 36 can condense and pull away from any wall or bottom (not shown) of a granular sorbent container, preferably litter box 46, containing litter 30 of the invention as the clump 36 shrinks which can reduce the surface area of contact between the clump 36 and litter box 46, which in certain instances can reduce clump sticking and can facilitate easier clump removal.

Litter 30 formed of a mixture of extruded litter pellets 34 and 34' of the present invention forms clumps 36 that each preferably shrink at least 5% after formation as the clump 36 dries forming a dried clump 36 that possesses at least 93% clump retention rate, preferably at least 95% clump retention rate, and more preferably at least 97% clump retention rate when dried in accordance with that discussed above pertaining to clump retention rates advantageously producing a "clean" clump 36 which minimizes adherence to any litter box 46 filled with the litter 30 and which also minimizes adherence to any litter scoop 48 used to scoop out any clump 36 formed in the litter 30 in the litter box 46. In one such preferred cat litter 38 of the present invention, each clump 36 formed of a mixture of pellets 34 and 34' preferably shrinks at least 8% while possessing at least 93% clump retention, preferably at least 95% clump retention, and more preferably at least 97% clump retention, producing such a "clean" "non-stick" clump 36 that minimizes adherence to any part of the litter box or even the litter scoop during clump removal. In another preferred cat litter 38 of the present invention, each clump 36 formed of a mixture extruded pellets 34 and 34' preferably shrinks at least 10% while possessing at least 93% clump retention, preferably at least 95% clump retention, and more preferably at least 97% clump retention, producing such a "clean" "non-stick" clump 36 that minimizes adherence to any part of the litter box or even the litter scoop during clump removal. In yet another such preferred cat litter 38 of the invention, each clump 36 formed of a mixture of extruded pellets 34 and 34', each clump 36 preferably shrinks at least 12% while possessing at least 93% clump retention, preferably at least 95% clump retention, and more preferably at least 97% clump retention, producing such a "clean" "non-stick" clump 36 maximizing the removal of dirty litter through higher spent litter granule retention and minimizing adherence to unspent litter pellets 34 and 34' and contacting solid surfaces.

Litter 30 made of or with a mixture of extruded pellets 34 and 34' of the present invention produces litter 30 that advantageously also is lightweight having a bulk density preferably no greater than 40 lbs/ft$^3$ and which is at least 40% less than conventional clay-based sorbent, i.e., bentonite-based cat litter. In a preferred litter embodiment, litter 30 made of a mixture of extruded litter pellets 34 and 34' in accordance with the present invention has a bulk density of no greater than 45 lbs/ft$^3$ that preferably is between 20 lbs/ft$^3$ and 40 lbs/ft$^3$, which more preferably is between 25 lbs/ft$^3$ and 35 lbs/ft$^3$, and which more preferably is between 27 lbs/ft$^3$ and 33 lbs/ft$^3$. In one preferred granular sorbent embodiment, litter 30 made in accordance with the present invention has extruded litter pellets 34 and 34' with a bulk density of no greater than 45 lbs/ft$^3$ that preferably is between 20 lbs/ft$^3$ and 40 lbs/ft$^3$, which more preferably is between 25 lbs/ft$^3$ and 35 lbs/ft$^3$, and which more preferably is between 27 lbs/ft$^3$ and 33 lbs/ft$^3$.

In a further preferred litter embodiment, litter 30 of the present invention is made substantially completely of such extruded pellets 34 and/or 34' with the extruded pellets 34 and/or 34' having a bulk density of between 15 lbs/ft$^3$ and 45 lbs/ft$^3$, which preferably is between 20 lbs/ft$^3$ and 40 lbs/ft$^3$, which more preferably is between 25 lbs/ft$^3$ and 35 lbs/ft$^3$, and which further preferably is between 27 lbs/ft$^3$ and 33 lbs/ft$^3$. In one such preferred litter embodiment, litter 30 of the present invention is composed of a mixture of extruded pellets 34 and 34' produce a litter 30 having a bulk density of no greater than 45 lbs/ft$^3$ that preferably is between 20 lbs/ft$^3$ and 40 lbs/ft$^3$, which more preferably is between 25 lbs/ft$^3$ and 35 lbs/ft$^3$, and which more preferably is between 27 lbs/ft$^3$ and 33 lbs/ft$^3$. In another such preferred litter embodiment, litter 30 of the present invention is substantially completely made of a mixture of such extruded pellets 34 and 34' producing litter 38 having a bulk density of no greater than 45 lbs/ft$^3$ that preferably is between 20 lbs/ft$^3$ and 40 lbs/ft$^3$, which more preferably is between 25 lbs/ft$^3$ and 35 lbs/ft$^3$, and which more preferably is between 27 lbs/ft$^3$ and 33 lbs/ft$^3$. In still another such preferred litter embodiment, litter 30 of the present invention is substantially completely composed of such extruded pellets 34 and/or 34' is composed of extruded pellets 34 and/or 34' having a bulk density of between 15 lbs/ft$^3$ and 45 lbs/ft$^3$, which preferably is between 20 lbs/ft$^3$ and 40 lbs/ft$^3$, which more preferably is between 25 lbs/ft³ and 35 lbs/ft³, and which further preferably is between 27 lbs/ft³ and 33 lbs/ft³.

In addition to litter 30 composed of extruded litter pellets 34 and/or 34' or a mixture of extruded litter pellets 34 and/or 34' forming clean clumps when wetted, such extruded pellets 34 and/or 34' are advantageously de-dusting pellets that each act as a dust magnet. Without being wetted, each extruded pellet 34 and/or 34' used in litter 30 of the present invention has sufficient water-soluble material in an outer surface 40 of each pellet 34 and/or 34' to cause dust in the litter 30 to adhere to the water-soluble material of the outer pellet surface 40 advantageously preventing such dust from becoming airborne. In a preferred embodiment, without being wetted, water soluble binder present in the outer surface 40 of each extruded pellet 34 and/or 34' of litter 30 of the present invention is a dust attracting pellet 34 and/or 34 or dust-magnet pellet 34 and/or 34' causing dust in the litter 30 to stick to water-soluble binder of the outer surface 40 of each pellet 34 and/or 34' coming into contact with the dust, while the binder is dry, preventing such dust from becoming airborne. Such de-dusting extruded litter pellets 34 in accordance with the present invention is well suited for use as cat litter 30 with retail bags or containers filled with such cat litter 30 composed of extruded pellets 34 and/or 34' or a mixture of extruded pellets 34 and 34' containing less than 5% dust, preferably less than 3% dust and preferably less than 1% dust by litter weight.

In a preferred litter embodiment, each litter pellet 34 and/or 34' is extruded from an admixture not containing any smectite nor any binder additive with each extruded pellet 34 and/or 34' used in the litter 30 in uncoated form. In another preferred litter embodiment, each litter pellet 34 and/or 34' is extruded from an admixture not containing any smectite nor any binder additive and is used in the litter 30 without any smectite, e.g., bentonite, coating. In still another preferred litter embodiment, each litter pellet 34 and/or 34' is extruded from an admixture not containing any smectite nor any binder additive and is used in the litter 30 in its as-extruded form.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A cat litter comprised of:
a plurality of pairs of pellets extruded from a starch-containing material, each one of the extruded pellets having a water absorbency of at least 4.5 times pellet weight and containing at least 7.5% water-soluble binder by pellet weight, the water-soluble binder in each extruded pellet formed from starch in the starch-containing material modified into the water-soluble binder during pellet extrusion; and
wherein:
(a) between 60% and 95% of the extruded pellets of the cat litter are extruded pellets of a first size range and which have a size greater than 1.0 mm and less than 3.0 mm; and
(b) between 5% and 40% of the extruded pellets of the cat litter are more extruded pellets of a second size range and which have a size greater than 0.5 mm and less than 1.0 mm; and
wherein wetting with water (i) a plurality of the extruded pellets first size range, and (ii) a plurality of the extruded pellets of the second size range forms a clump comprised thereof extending generally horizontally on top of the cat litter.

2. The eat litter of claim 1, wherein the water-soluble binder in each one of the extruded pellets comprises a cold water-soluble binder that is water soluble at temperatures below 110° Fahrenheit.

3. The cat litter of claim 1, wherein each one of the extruded pellets is comprised of a water solubles content that is greater than the water-soluble binder content of each one of the extruded pellets, the water solubles content formed of starch in the starch-containing mixture that is modified during pellet extrusion.

4. The cat litter of claim 3, wherein each one of the extruded pellets is comprised of at least 15% water solubles content by pellet weight.

5. The cat litter of claim 1, wherein each extruded pellet is comprised of at least 50% starch by pellet weight.

6. The cat litter of claim 5, wherein each extruded pellet is comprised of no more than 50% cellulose by pellet weight.

7. The cat litter of claim 1, wherein the clump has a clump retention rate of at least 99%.

8. The cat litter of claim 1, wherein the clump has a clump crush strength of at least 35 pounds per square inch when the clump is dried to a moisture content of no greater than 20% by clump weight.

9. The cat litter of claim 1, wherein the clump shrinks at least 5% after clump formation when the clump is dried to a moisture content of no greater than 20% by clump weight.

10. The cat litter of claim 1, wherein (i) the plurality of the wetted extruded pellets of the first size range, and (ii) the plurality of the wetted extruded pellets of the second size range that form the clump absorb at least one times a weight in water of (i) the plurality of unspent or unused extruded pellets of the first size range, and (ii) the plurality of unspent or unused extruded pellets of the second size range within 60 seconds of being wetted with the water.

11. The cat litter of claim 1, wherein the water-soluble binder in (i) the plurality of the wetted extruded pellets of the first size range, and (ii) the plurality of the wetted extruded pellets of the second size range are solubilized when wet with water into a flowable adhesive that flows therefrom and increases in viscosity over time into an adhesive gel that adhesively glues together the (i) the plurality of the wetted extruded pellets of the first size range, and (ii) the plurality of the wetted extruded pellets of the second size range into the clump comprised thereof.

12. The cat litter of claim 1, wherein the extruded pellets of the second size range comprise fines.

13. A cat litter comprised of:
a plurality of pairs of pellets extruded from a starch-containing material, each one of the extruded pellets having a water absorbency of at least 4.5 times pellet weight and containing at least 7.5% cold water-soluble binder by pellet weight, the at least 7.5% cold water-soluble binder in each extruded pellet formed from starch in the starch-containing material physically modified into the cold water-soluble binder during pellet extrusion and which is an amount of cold water-soluble binder sufficient to form a clump of the plurality of pairs of pellets when wetted with water; and wherein:
(a) between 60% and 95% of the extruded pellets of the cat litter are extruded pellets of a first size range and which have a size greater than 1.0 mm and less than 3.0 mm; and
(b) between 5% and 40% of the extruded pellets of the cat litter are extruded pellets of a second size range and which have a size greater than 0.5 mm and less than 1.0 mm; and wherein the cat litter comprised of (i) the plurality of the extruded pellets of the first size range defined in (a), and the plurality of the extruded pellets of the second size range defined in (b) form a clump comprised thereof when (i) the plurality of the extruded pellets of the first size range defined in (a), and (ii) the plurality of the extruded pellets of the second size range defined in (b) are wetted with water, the clump extending generally horizontally on top of the cat litter.

14. The cat litter of claim 13, wherein the cold water-soluble binder is water soluble at temperatures below 110° Fahrenheit.

15. The cat litter of claim 13, wherein each one of the extruded pellets is comprised of a cold water solubles content that is greater than the cold water-soluble binder content of each one of the extruded pellets, the water solubles content formed of starch in the starch-containing mixture that is modified during pellet extrusion.

16. The cat litter of claim 15, wherein each one of the extruded pellets is comprised of at least 15% cold water solubles content by pellet weight.

17. The cat litter of claim 13, wherein each extruded pellet is comprised of at least 50% starch by pellet weight.

18. The cat litter of claim 17, wherein each extruded pellet is comprised of no more than 50% cellulose by pellet weight.

19. The cat litter of claim 13, wherein the clump has a clump retention rate of at least 99%.

20. The cat litter of claim 13, wherein the clump has a clump crush strength of at least 35 pounds per square inch when the clump is dried to a moisture content of no greater than 20% by clump weight.

21. The cat litter of claim 13, wherein the clump shrinks at least 5% after clump formation when the clump is dried to a moisture content of no greater than 20% by clump weight.

22. The cat litter of claim 13, wherein (i) the plurality of the wetted extruded pellets of the first size range, and (ii) the plurality of the wetted extruded pellets of the second size range that form the clump absorb at least one times a weight in water of (i) the plurality of unspent or unused extruded pellets of the first size range, and (ii) the plurality of unspent or unused extruded pellets of the second size range within 60 seconds of being wetted with the water.

23. The cat litter of claim 13, wherein the cold water-soluble binder in (i) the plurality of the wetted extruded pellets of the first size range, and (ii) the plurality of the wetted extruded pellets of the second size range is solubilized when wet with water into a flowable adhesive that flows therefrom and increases in viscosity over time into an adhesive gel that adhesively glues together the (i) plurality of the wetted extruded pellets of the first size range, and (ii) the plurality of the wetted extruded pellets of the second size range into the clump comprised thereof.

* * * * *